US011656666B2

(12) United States Patent
Jahagirdar et al.

(10) Patent No.: US 11,656,666 B2
(45) Date of Patent: May 23, 2023

(54) DYNAMIC POWER SOURCE SELECTION, CHARGING, AND DISCHARGING

(71) Applicant: Microsoft Technology Licensing, LLC, Redmond, WA (US)

(72) Inventors: Aniruddha Jayant Jahagirdar, Bellevue, WA (US); Ranveer Chandra, Kirkland, WA (US); Anirudh Badam, Issaquah, WA (US); James Anthony Schwartz, Jr., Seattle, WA (US); Paresh Maisuria, Issaquah, WA (US); Matthew Holle, Kirkland, WA (US); M. Nashaat Soliman, Redmond, WA (US); Murtuza S. Naguthanawala, Sammamish, WA (US); Tapan Ansel, Redmond, WA (US); Aacer Hatem Daken, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 347 days.

(21) Appl. No.: 16/440,923

(22) Filed: Jun. 13, 2019

(65) Prior Publication Data
US 2020/0004304 A1 Jan. 2, 2020

Related U.S. Application Data

(63) Continuation-in-part of application No. 15/353,596, filed on Nov. 16, 2016, now Pat. No. 10,488,905, and (Continued)

(51) Int. Cl.
*G06F 1/20* (2006.01)
*G06F 1/26* (2006.01)
(Continued)

(52) U.S. Cl.
CPC .............. *G06F 1/263* (2013.01); *G06F 1/206* (2013.01); *G06F 1/3206* (2013.01); *H02J 7/0013* (2013.01); *H02J 7/0063* (2013.01)

(58) Field of Classification Search
None
See application file for complete search history.

(56) References Cited

U.S. PATENT DOCUMENTS 4,743,831 A 5/1988 Young
5,270,946 A 12/1993 Shibasaki et al.
(Continued)

FOREIGN PATENT DOCUMENTS

CN 101853059 A 10/2010
CN 102185164 A 9/2011
(Continued)

OTHER PUBLICATIONS

"Non Final Office Action Issued in U.S. Appl. No. 15/353,548", dated Oct. 1, 2019, 13 Pages.
(Continued)

*Primary Examiner* — Phil K Nguyen
(74) *Attorney, Agent, or Firm* — Newport IP, LLC; Jacob P. Rohwer

(57) ABSTRACT

A computing device has an energy storage device system with multiple energy storage devices. Various different criteria are used to determine which one or more of the multiple energy storage devices to charge or discharge at any given time to provide power to the computing device. The criteria can include characteristics of the energy storage devices as well as hardware and/or physical characteristics of the computing device, characteristics of the energy storage devices and/or the computing device that change while the computing device operates, and predicted behavior or usage of the computing device. These criteria are evaluated during
(Continued)

operation of the computing device, and the appropriate energy storage device(s) from which to draw power or to charge at any given time based on these criteria are determined.

18 Claims, 12 Drawing Sheets

Related U.S. Application Data a continuation-in-part of application No. 15/353,581, filed on Nov. 16, 2016, now abandoned, and a continuation-in-part of application No. 15/353,548, filed on Nov. 16, 2016, now abandoned.

(51) Int. Cl.
*H02J 7/00* (2006.01)
*G06F 1/3206* (2019.01)

(56) References Cited

U.S. PATENT DOCUMENTS

| | | |
|---|---|---|
| 5,371,682 A | 12/1994 | Levine et al. |
| 5,565,759 A | 10/1996 | Dunstan |
| 5,656,920 A | 8/1997 | Cherng et al. |
| 5,757,163 A | 5/1998 | Brotto et al. |
| 6,225,780 B1 | 5/2001 | Koch |
| 6,288,521 B1 | 9/2001 | Meador |
| 6,289,399 B1 | 9/2001 | Furuichi et al. |
| 6,870,349 B2 | 3/2005 | Cook |
| 7,505,795 B1 | 3/2009 | Lim et al. |
| 7,576,517 B1 | 8/2009 | Cotton et al. |
| 7,663,344 B2 | 2/2010 | Le Gall et al. |
| RE41,676 E | 9/2010 | Yau et al. |
| 7,853,735 B2 | 12/2010 | Jin et al. |
| 7,915,860 B2 | 3/2011 | Quint et al. |
| 7,960,945 B1 | 6/2011 | Onorato et al. |
| 8,054,962 B2 | 11/2011 | Anglin et al. |
| 8,120,321 B2 | 2/2012 | Vezzini et al. |
| 8,126,517 B2 | 2/2012 | Ashbrook et al. |
| 8,135,443 B2 | 3/2012 | Aleksic et al. |
| 8,179,095 B1 | 5/2012 | Onorato et al. |
| 8,237,411 B2 | 8/2012 | Liu et al. |
| 8,250,384 B2 | 8/2012 | Borghetti et al. |
| 8,452,353 B2 | 5/2013 | Crawford |
| 8,581,548 B2 | 11/2013 | Goff et al. |
| 8,599,840 B2 | 12/2013 | Albert et al. |
| 8,665,214 B2 | 3/2014 | Forutanpour et al. |
| 8,751,845 B2 | 6/2014 | Assad et al. |
| 8,762,756 B1 | 6/2014 | Moy |
| 8,798,685 B2 | 8/2014 | Stekkelpak et al. |
| 8,813,177 B2 | 8/2014 | Srour et al. |
| 8,872,481 B2 | 10/2014 | Chawla et al. |
| 8,917,061 B2 | 12/2014 | Zhu |
| 8,996,113 B2 | 3/2015 | Ries et al. |
| 9,009,502 B2 | 4/2015 | Udeshi et al. |
| 9,043,085 B2 | 5/2015 | Sisk |
| 9,058,128 B1 | 6/2015 | Robison et al. |
| 9,070,273 B2 | 6/2015 | Lombardi et al. |
| 9,152,202 B2 | 10/2015 | Seinfeld et al. |
| 9,189,055 B2 | 11/2015 | Yang et al. |
| 9,210,662 B1 | 12/2015 | Brown et al. |
| 9,285,851 B2 * | 3/2016 | Hodges ................ G06F 1/3206 |
| 9,342,125 B1 | 5/2016 | Fitch et al. |
| 9,377,839 B2 | 6/2016 | Sasidharan et al. |
| 9,385,557 B2 | 7/2016 | Causey et al. |
| 9,430,280 B1 | 8/2016 | Shih et al. |
| 9,431,828 B2 | 8/2016 | Besser et al. |
| 10,061,366 B2 * | 8/2018 | Badam .................... G06F 1/263 |
| 10,488,905 B2 * | 11/2019 | Jahagirdar ............ G06F 1/3203 |
| 10,725,529 B2 | 7/2020 | Maisuria et al. |
| 10,903,665 B2 | 1/2021 | Prabhakar et al. |
| 2003/0042741 A1 | 3/2003 | Hartman et al. |
| 2004/0125514 A1 | 7/2004 | Gunther et al. |
| 2004/0232892 A1 | 11/2004 | Aradachi et al. |
| 2005/0083016 A1 | 4/2005 | Yau et al. |
| 2005/0275372 A1 | 12/2005 | Crowell |
| 2006/0156045 A1 | 7/2006 | Galles |
| 2006/0184287 A1 | 8/2006 | Belady et al. |
| 2007/0083781 A1 | 4/2007 | Aoyagi |
| 2007/0247186 A1 | 10/2007 | Sakata et al. |
| 2008/0055311 A1 | 3/2008 | Aleksic et al. |
| 2008/0201587 A1 | 8/2008 | Lee |
| 2008/0306637 A1 | 12/2008 | Borumand et al. |
| 2009/0088991 A1 | 4/2009 | Brzezowski et al. |
| 2009/0249095 A1 | 10/2009 | Poomachandran et al. |
| 2010/0211804 A1 | 8/2010 | Brumley et al. |
| 2010/0287559 A1 | 11/2010 | Mergen et al. |
| 2010/0304192 A1 | 12/2010 | Wood et al. |
| 2010/0304251 A1 | 12/2010 | Chan et al. |
| 2011/0047552 A1 | 2/2011 | Mergen et al. |
| 2011/0159931 A1 | 6/2011 | Boss et al. |
| 2011/0166810 A1 | 7/2011 | Grider et al. |
| 2011/0288898 A1 | 11/2011 | Roe |
| 2012/0072752 A1 | 3/2012 | Kennedy et al. |
| 2012/0144219 A1 | 6/2012 | Salahshour et al. |
| 2012/0210150 A1 | 8/2012 | de lind van Wijngaarden et al. |
| 2012/0210325 A1 | 8/2012 | de lind van Wijngaarden et al. |
| 2012/0254634 A1 | 10/2012 | Chakra et al. |
| 2012/0260118 A1 | 10/2012 | Jiang et al. |
| 2012/0274279 A1 | 11/2012 | Banos et al. |
| 2012/0274641 A1 | 11/2012 | Diard |
| 2012/0299554 A1 | 11/2012 | Kruglick |
| 2012/0317432 A1 | 12/2012 | Assad et al. |
| 2013/0009468 A1 | 1/2013 | Ishidera |
| 2013/0030593 A1 | 1/2013 | Gao et al. |
| 2013/0093391 A1 | 4/2013 | Gale et al. |
| 2013/0176000 A1 | 7/2013 | Bishop et al. |
| 2013/0191662 A1 | 7/2013 | Ingrassia et al. |
| 2013/0231894 A1 | 9/2013 | Paakkonen et al. |
| 2013/0257382 A1 | 10/2013 | Field et al. |
| 2013/0300374 A1 | 11/2013 | Tomita et al. |
| 2014/0042977 A1 | 2/2014 | Kim |
| 2014/0045436 A1 | 2/2014 | Gutierrez, Jr. |
| 2014/0136799 A1 | 5/2014 | Fortin |
| 2014/0195066 A1 | 7/2014 | Nanda et al. |
| 2014/0210265 A1 | 7/2014 | Thorsoe |
| 2014/0281645 A1 | 9/2014 | Sen et al. |
| 2014/0331068 A1 | 11/2014 | Cao |
| 2014/0356656 A1 | 12/2014 | Chen et al. |
| 2015/0048796 A1 | 2/2015 | Sherstyuk et al. |
| 2015/0212560 A1 | 7/2015 | Ueda |
| 2015/0227445 A1 | 8/2015 | Arscott et al. |
| 2015/0277454 A1 | 10/2015 | Carbone et al. |
| 2015/0293575 A1 | 10/2015 | Hampson et al. |
| 2015/0323974 A1 | 11/2015 | Shuster et al. |
| 2015/0347204 A1 | 12/2015 | Stanley-marbell et al. |
| 2015/0351037 A1 | 12/2015 | Brown et al. |
| 2015/0357842 A1 | 12/2015 | Bailly et al. |
| 2016/0034022 A1 | 2/2016 | Sutardja et al. |
| 2016/0073351 A1 | 3/2016 | Cardozo et al. |
| 2016/0077562 A1 | 3/2016 | Smith |
| 2016/0146899 A1 | 5/2016 | Teng et al. |
| 2016/0209906 A1 | 7/2016 | Chae et al. |
| 2016/0210174 A1 | 7/2016 | Hsieh et al. |
| 2016/0224648 A1 | 8/2016 | Le |
| 2016/0231801 A1 | 8/2016 | Chandra et al. |
| 2016/0242119 A1 | 8/2016 | Shedletsky et al. |
| 2016/0248125 A1 * | 8/2016 | Huang ............... H01M 10/4207 |
| 2016/0248266 A1 | 8/2016 | Ferrese et al. |
| 2016/0291683 A1 | 10/2016 | Kacker et al. |
| 2017/0133867 A1 | 5/2017 | Banos et al. |
| 2017/0139459 A1 * | 5/2017 | Badam .................. G06F 1/3212 |
| 2017/0346303 A1 | 11/2017 | Vanblon et al. |
| 2017/0371394 A1 | 12/2017 | Chan et al. |
| 2018/0123358 A1 | 5/2018 | Prabhakar et al. |
| 2018/0136704 A1 | 5/2018 | Jahagirdar et al. |
| 2018/0136708 A1 | 5/2018 | Jahagirdar et al. |
| 2018/0136709 A1 | 5/2018 | Jahagirdar et al. |
| 2018/0267839 A1 | 9/2018 | Maisuria et al. |
| 2018/0321731 A1 | 11/2018 | Alfano et al. |

(56) References Cited

U.S. PATENT DOCUMENTS

2018/0373316 A1    12/2018   Maisuria et al.
2020/0004304 A1*   1/2020   Jahagirdar .............. G06F 1/263

FOREIGN PATENT DOCUMENTS

| | | |
|---|---|---|
| CN | 103477531 A | 12/2013 |
| CN | 103580108 A | 2/2014 |
| CN | 103593029 A | 2/2014 |
| CN | 103793040 A | 5/2014 |
| CO | 97019672 A1 | 5/1998 |
| EP | 0727728 A1 | 8/1996 |
| EP | 3658932 A1 | 6/2020 |
| JP | 2013106372 A | 5/2013 |
| JP | 2015100236 A | 5/2015 |
| KR | 20110084768 A | 7/2011 |
| KR | 101521585 B1 | 5/2015 |
| MX | 2017001107 A | 9/2017 |
| WO | 9305560 A1 | 3/1993 |
| WO | 2006126022 A1 | 11/2006 |
| WO | 2009128079 A1 | 10/2009 |
| WO | 2012149482 A2 | 11/2012 |
| WO | 2014039311 A1 | 3/2014 |
| WO | 2016032908 A1 | 3/2016 |
| WO | 2016133687 A1 | 8/2016 |
| WO | 2016133688 A1 | 8/2016 |
| WO | 2016160748 A1 | 10/2016 |
| WO | 2018093646 A1 | 5/2018 |

OTHER PUBLICATIONS

"Notice of Allowance Issued in U.S. Appl. No. 15/633,514", dated Oct. 21, 2019, 06 Pages.
"Non Final Office Action Issued in U.S. Appl. No. 15/340,790", dated Mar. 31, 2020, 9 Pages.
"Notice of Allowance Issued in U.S. Appl. No. 15/633,514", dated Aug. 29, 2019, 6 Pages.
"Office Action and Search Report Issued in Colombian Patent Application No. NC2019/0004772", dated Jan. 26, 2021, 18 Pages.
"Dual Smart Battery System Manager", Retrieved: http://cds.linear.com/docs/en/datasheet/1760fb.pdf, Oct. 19, 2016, pp. 1-48.
"Greenify", Retrieved: https://play.google.com/store/apps/details?id=com.oasisfeng.greenify&hl=en_IN , Oct. 9, 2016, 5 pages.
"GSam Battery Monitor", https://play.google.com/store/apps/details?id=com.gsamlabs.bbm&hl=en_IN , Jul. 11, 2016, 6 Pages.
"Watchdog Task Manager Lite", Retrieved: https://play.google.com/store/apps/details?id=com.zomut.watchdoglite, Feb. 5, 2012, 5 Pages.
"Final Office Action Issued in U.S. Appl. No. 15/340,790", dated Jun. 19, 2019, 14 Pages.
"Non Final Office Action Issued in U.S. Appl. No. 15/340,790", dated Nov. 2, 2018, 16 Pages.
"Final Office Action Issued in U.S. Appl. No. 15/353,548", dated May 23, 2019, 23 Pages.
"Non Final Office Action in U.S. Appl. No. 15/353,548", dated Jan. 7, 2019, 14 Pages.
"Final Office Action Issued in U.S. Appl. No. 15/353,581", dated Jun. 20, 2019, 25 Pages.
"Non Final Office Action Issued in U.S. Appl. No. 15/353,581", dated Sep. 14, 2018, 21 Pages.
"Non-Final Office Action Issued in U.S. Appl. No. 15/353,596", dated Aug. 31, 2018, 18 Pages.
"Final Office Action Issued in U.S. Appl. No. 15/463,918", dated Apr. 19, 2019, 35 Pages.
"Non Final Office Action Issued in U.S. Appl. No. 15/463,918", dated Sep. 21, 2018, 28 Pages.
"Non Final Office Action Issued in U.S. Appl. No. 15/633,514", dated Mar. 5, 2019, 24 Pages.
Badam, et al., "Software Defined Batteries", In Proceedings of the 25th Symposium on Operating Systems Principles, Oct. 4, 2015, pp. 1-15.

Gurries, Mark, "Monolithic Dual Battery Power Manager Increases Run Time and Decreases Charge Time", In Linear Technology Magazine, Dec. 2001, 6 pages.
Hoffman, "How to See Which Apps Are Draining Your Battery on an Android Phone or Tablet", Retrieved: https://www.howtogeek.com/244748/how-to-see-which-apps-are-draining-your-battery-on-an-android-phone-or-tablet/, Mar. 15, 2016, 6 pages.
Jiang, "Synergetic Control of Power Converters for Pulse Current Charging of Advanced Batteries From a Fuel Cell Power Source", In Journal of IEEE Transactions on Power Electronics, vol. 19, Issue 4,, Jun. 2004, pp. 1140-1150.
Kannan, "Limit Battery Drain on Lollipop by Limiting Background Processes & Killing Apps Activities", Retrieved: https://techtrickz.com/how-to/limit-battery-drain-on-lollipop-by-limiting-background-processes-killing-apps-activities/, Aug. 13, 2015, 7 pages.
"International Search Report & Written Opinion for PCT Patent Application No. PCT/US17/060733", dated Apr. 25, 2018, 10 Pages.
"International Search Report & Written Opinion for PCT Patent Application No. PCT/US18/022083", dated Jun. 13, 2018, 17 Pages.
"International Search Report and Written Opinion Issued in PCT Application No. PCT/US18/033582", dated Aug. 20, 2018, 17 Pages.
"International Search Report and Written opinion Issued In PCT Application No. PCT/US2017/060734", dated Apr. 3, 2018, 12 Pages.
"International Search Report and Written Opinion Issued in PCT Application No. PCT/US2017/060736", dated Apr. 18, 2018, 43 Pages.
"Invitation to Pay additional Fee Issued in PCT Application No. PCT/US17/060736", dated Feb. 16, 2018, 17 Pages.
Rong, "An Analytical Model for Predicting the Remaining Battery Capacity Prediction for Lithium-Ion Batteries", In Proceedings of the conference on Design, Automation and Test in Europe—vol. 1,, Mar. 2003, 2 pages.
Weinberger, Matt, "Microsoft has a crazy plan to make your batteries last a lot longer", Retrieved: https://www.businessinsider.com/microsoft-research-multiple-batteries-for-a-laptop-project-2015-10/?r=AU&IR=T, Oct. 5, 2015, 9 pages.
Yin, "Pulse-Based Fast Battery IoT Charger Using Dynamic Frequency and Duty Control Techniques Based on Multi-Sensing of Polarization Curve", In Journal of Energies vol. 9, Issue 3,, Mar. 17, 2016, 20 pages.
Yuan, "GRACE-1 Cross-Layer Adaptation for Multimedia Quality and Battery Energy", In Journal of IEEE Transactions on Mobile Computing, vol. 5, No. 7,, Jul. 2006, pp. 799-815.
"Non Final Office Action Issued in U.S. Appl. No. 15/463,918", dated Dec. 11, 2019, 27 Pages.
"Office Action Issued in European Patent Application No. 17801576.4", dated Jun. 15, 2021, 7 Pages.
"Office Action Issued in European Patent Application No. 17801577.2", dated Jun. 23, 2021, 6 Pages.
"Notice of Allowance Issued in U.S. Appl. No. 15/633,514", dated Feb. 12, 2020, 6 Pages.
"Advisory Action Issued in U.S. Appl. No. 15/340,790", dated Sep. 13, 2019, 4 Pages.
"First Office Action and Search Report Issued in Chinese Patent Application No. 201780070731.5", dated Dec. 10, 2021, 10 Pages.
"Office Action Issued in Indian Patent Application No. 201947019883", dated Dec. 3, 2021, 5 Pages.
"Notice of Allowance Issued in European Patent Application No. 18731600.5", dated Apr. 26, 2022, 2 Pages.
"Notice of Allowance Issued in Chinese Patent Application No. 201780070731.5", dated Apr. 19, 2022, 4 Pages.
"First Office Action and Search Report Issued in Chinese Patent Application No. 201780070768.8", dated Nov. 4, 2022, 24 Pages.

* cited by examiner

DYNAMIC POWER SOURCE SELECTION, CHARGING, AND DISCHARGING

CROSS-REFERENCE TO RELATED APPLICATIONS

This application is a Continuation In Part of: pending application Ser. No. 15/353,548, filed Nov. 16, 2016, titled DYNAMIC EXTERNAL POWER RESOURCE SELECTION; pending application Ser. No. 15/353,581, filed Nov. 16, 2016, titled DYNAMIC ENERGY STORAGE DEVICE CHARGING; and pending application Ser. No. 15/353,596, filed Nov. 16, 2016, titled DYNAMIC ENERGY DEVICE DISCHARGING.

BACKGROUND

As technology has advanced, mobile computing devices have become increasingly commonplace. Mobile computing devices provide various functionality to users, allowing the user to interact with the device to check email, surf the web, compose text messages, interact with applications, and so on. One challenge that faces developers of mobile computing devices is efficient power management and extension of battery life. If power management implemented for a device fails to provide a good battery life, user dissatisfaction with the device and manufacturer may result.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

External Power Source Selection

In a computing device having an energy storage device system including one or more energy storage devices, multiple power resources available to the computing device to charge a first energy storage device of the one or more energy storage devices are identified. A first power resource of the multiple power resources that is most energy efficient for the first energy storage device is selected, and the energy storage device system is configured to charge the first energy storage device using the first power resource.

For each of the multiple power resources, thermal activity along a charging path from the power resource to the first energy storage device is determined. A power resource of the multiple power resources based on the thermal activity along the charging paths from the multiple power resources to the first energy storage device is selected, and the energy storage device system is configured to charge the first energy storage device using the selected power source.

The computing device may determine that an amount of charge in the one or more energy storage devices is below a threshold amount of charge, determining that the computing device is predicted to be connected to a power resource for less than a threshold amount of time, and thermally conditioning the computing device, prior to the computing device being connected to the power resource, to reduce a temperature of the computing device.

Energy Storage Device Charging

In a computing device having an energy storage device system including multiple energy storage devices, a temperature for each of multiple thermal zones of the computing device is determined. Based on multiple criteria regarding operation of the computing device, one or more of the multiple energy storage devices to charge is determined, the multiple criteria including the temperature of each of the one or more thermal zones. The energy storage device system is configured to charge each of the one or more of the multiple energy storage devices.

Values for multiple criteria regarding the computing device and/or multiple energy storage devices are determined. The multiple criteria include removable energy storage device presence predictions. Based on the values for the multiple criteria, a determination is made to charge a first energy storage device of the multiple energy storage devices, the values for the multiple criteria including an indication that a second energy storage device of the multiple energy storage devices is predicted to be removed from the computing device within a threshold amount of time. The energy storage device system is configured to charge the first energy storage device.

Energy Storage Device Discharging

In a computing device having multiple energy storage devices, a temperature for each of multiple thermal zones of the computing device is determined. Based on multiple criteria regarding operation of the computing device, one or more of the multiple energy storage devices to draw power from is determined, the multiple criteria including the temperature of each of the one or more thermal zones. Each of the one or more of the multiple energy storage devices is configured to provide power to the computing device.

In a computing device having multiple energy storage devices, values for multiple criteria regarding the computing device are determined. The multiple criteria include hardware characteristics of the computing device, the hardware characteristics of the computing device including proximity of each of the multiple energy storage devices to a component of the computing device. Based on the multiple criteria, one or more of the multiple energy storage devices to draw power from is determined, the determining the one or more energy storage devices including identifying one of the multiple energy storage devices that is closest to the component. Each of the one or more of the multiple energy storage devices is configured to provide power to the computing device, the configuring including configuring the one of the multiple energy storage devices that is closest to the component to provide power to the component.

A computing device includes an energy storage device system including multiple energy storage devices, and an energy storage device discharge selection system configured to communicate, to the energy storage device system, an indication of which of the multiple energy storage devices to draw power from. The energy storage device discharge selection system includes a static criteria determination module, a dynamic system criteria determination module, and an energy storage device selection module. The static criteria determination module configured to determine values for characteristics of the multiple energy storage devices and physical characteristics of the computing device. The dynamic system criteria determination module configured to determine values for characteristics of the energy storage devices and/or the computing device that change while the computing device operates, including temperatures of one or more thermal zones in the computing device. The energy storage device selection module configured to select, based on the values determined by the static criteria determination module and the dynamic system criteria determination module, which of the multiple energy storage devices to draw power from.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

In the discussion that follows, a section titled "OPERATING ENVIRONMENT" describes one example environment in which one or more implementations can be employed. Following this, sections titled "DYNAMIC EXTERNAL POWER RESOURCE SELECTION SYSTEM", "DYNAMIC EXTERNAL POWER RESOURCE SELECTION SYSTEM", and "ENERGY STORAGE DEVICE DISCHARGE SELECTION SYSTEM" respectively describe example details and procedures in accordance with one or more implementations. Last, a section titled "EXAMPLE SYSTEM" describes example computing systems, components, and devices that can be utilized for one or more implementations of dynamic external power resource selection and dynamic storage device charging/discharging selection.

Operating Environment

Figure 1:
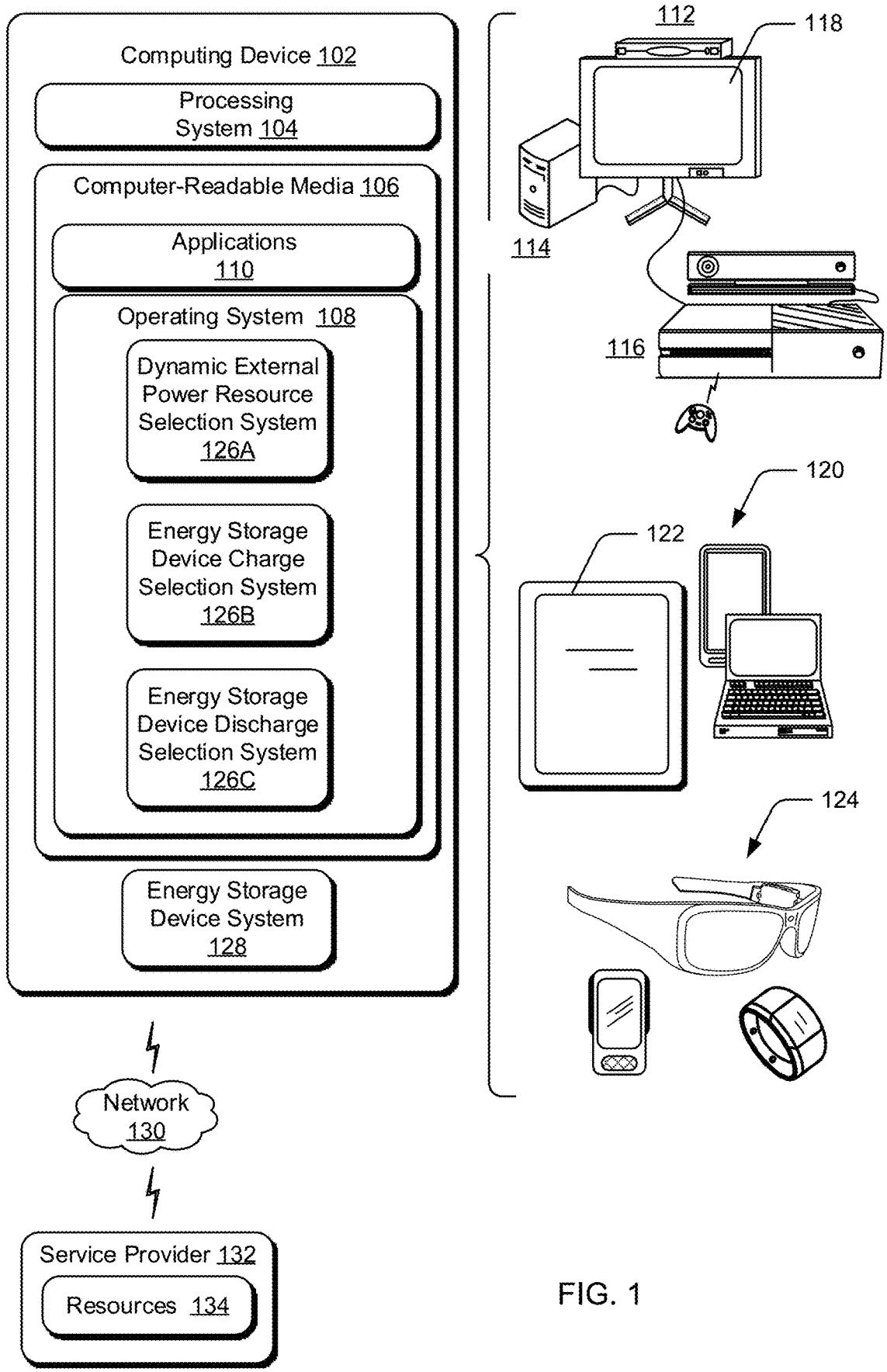
FIG. 1 illustrates an operating environment.

FIG. 1 illustrates an operating environment in accordance with one or more embodiments. The environment includes a computing device 102 having a processing system 104 with one or more processors and devices (e.g., CPUs, GPUs, microcontrollers, hardware elements, fixed logic devices, etc.), one or more computer-readable media 106, an operating system 108, and optionally one or more applications 110 that reside on the computer-readable media and which are executable by the processing system. The processing system 104 may be configured to include multiple independent processors configured in parallel or in series and one or more multi-core processing units. A multi-core processing unit may have two or more processors ("cores") included on the same chip or integrated circuit. In one or more implementations, the processing system 104 may include multiple processing cores that provide a range of performance capabilities, processing efficiencies, and power usage characteristics.

The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a rack server or other server computer, a portable computer, a tablet or slate computer, a handheld computer such as a personal digital assistant (PDA), a cell phone, a set-top box, a wearable device (e.g., watch, band, glasses, virtual reality (VR) headsets, augmented reality (AR) headsets, etc.), a home computing device (e.g., a voice-controlled wireless speaker or other smart-home device), an enterprise commodity device (e.g., an automated teller machine (ATM)), other consumer devices (e.g., drones, smart clothing, etc.), and so forth. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. A computing device may also be configured as a wearable device 124 that is designed to be worn by, attached to, carried by, or otherwise transported by a user. Examples of wearable devices 124 depicted in FIG. 1 include glasses, headsets, a smart band or watch, and a pod device such as clip-on fitness device, media player, or tracker. Other examples of wearable devices 124 include but are not limited to badges, a key fob, an access card, and a ring, an article of clothing, a glove, or a bracelet, to name a few examples. Any of the computing devices can be implemented with various components, such as one or more processors and memory devices, as well as with any combination of differing components. One example of a computing system that can represent various systems and/or devices including the computing device 102 is shown and described below in relation to FIG. 5.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 5.

The computing device 102 also includes a dynamic external power resource selection system 126A and an energy storage device system 128 that operate as described above and below. The dynamic external power resource selection system 126A can be implemented as part of the operating system 108, can be implemented as separate from the operating system 108, or can be implemented in part by the operating system 108 and in part separate from the operating system 108. The dynamic external power resource selection system 126A can optionally be implemented as one or more discreet systems working in concert. The energy storage device system 128 is configured to include one or more energy storage devices as discussed in greater detail below. The dynamic external power resource selection system 126A and energy storage device system 128 may be provided using any suitable combination of hardware, software, firmware, and/or logic devices. As illustrated, the dynamic external power resource selection system 126A and energy storage device system 128 may be configured as separate, standalone systems. In addition or alternatively, the dynamic external power resource selection system 126A may also be configured as a system or module that is combined with the operating system 108 or implemented via a controller or other component of the energy storage device system 128.

The dynamic external power resource selection system 126A is operable to manage charging of the energy storage devices of the energy storage device system 128, including selecting power resources to charge energy storage devices of the energy storage device system 128, allowing selection of different power resources for charging the energy storage devices at different times. This may involve analyzing various criteria including static criteria for the computing device 102, dynamic system criteria for the computing device 102, and usage prediction for the computing device 102. The static criteria, in contrast to the dynamic system criteria for the computing device 102, do not typically change while the computing device 102 operates. The static criteria for the computing device 102 refers to physical characteristics of (such as the locations of hardware in) the computing device 102, characteristics of static software and/or firmware, static properties such as interconnect resistance or thermal zone layout (e.g., which devices are in which thermal zones) as discussed in more detail below, and so forth. The dynamic system criteria for the computing device 102 refers to characteristics of the energy storage devices that are part of the energy storage device system 128 and/or the computing device 102 that change while the computing device 102 operates (e.g., runs the operating system 108 and one or more applications 110). The prediction criteria for the computing device 102 refers to estimated or predicted user behavior, program behavior, and/or more general usage of the computing device 102, such as connection of the computing device 102 to a power resource.

The dynamic external power resource selection system 126A can manage charging the energy storage devices by controlling modes of the energy storage device system 128, states of battery cells or other energy storage devices of the energy storage device system 128, routing of power from power resources to the energy storage device system 128, and so forth. For example, the dynamic external power resource selection system 126A is operable to communicate control signals or otherwise interact with the energy storage device system 128 to direct operation of switching hardware to switch between energy storage devices to provide charging current to energy storage devices of the energy storage device system 128 in accordance with the analysis performed by the dynamic external power resource selection system 126A. Details regarding these and other aspects of dynamic external power resource selection are discussed in the following section.

The computing device 102 also includes an energy storage device charge selection system 126B that represents functionality operable to manage energy storage devices of the energy storage device system 128, allowing selection of different energy storage devices for charging at different times. This may involve analyzing various criteria including static criteria for the computing device 102, dynamic system criteria for the computing device 102, and/or prediction criteria for the computing device 102. The static criteria, in contrast to the dynamic system criteria for the computing device 102, do not typically change while the computing device 102 operates. The static criteria for the computing device 102 refers to characteristics of the energy storage devices that are part of the energy storage device system 128, hardware included in and/or other physical characteristics of (such as the locations of hardware in) the computing device 102, characteristics of static software and/or firmware, static properties such as interconnect resistance or thermal zone layout (e.g., which devices are in which thermal zones) as discussed in more detail below, and so forth. The dynamic system criteria for the computing device 102 refers to characteristics of the energy storage devices that are part of the energy storage device system 128 and/or the computing device 102 that changes while the computing device 102 operates (e.g., runs the operating system 108 and one or more applications 110). The prediction criteria for the computing device 102 refers to estimated or predicted user behavior, program behavior, and/or more general usage of the computing device 102, such as removal or insertion of hot-swappable batteries that are part of the energy storage device system 128, duration of a connection of the computing device 102 to an AC power source, expected future workload and/or power usage of the computing device 102, and so forth.

The computing device 102 further includes an energy storage device charge selection system 126B that can manage the energy storage devices by controlling modes of the energy storage device system 128, states of battery cells or other energy storage devices of the energy storage device system 128, availability of energy storage devices of the energy storage device system 128, and so forth. For example, the energy storage device charge selection system 126B is operable to communicate control signals or otherwise interact with the energy storage device system 128 to direct operation of switching hardware to switch between energy storage devices to provide charging current to energy storage devices of the energy storage device system 128 in accordance with the analysis performed by the energy storage device charge selection system 126B. Details regarding these and other aspects of dynamic energy storage device charging are discussed in the following section.

The computing device 102 also includes an energy storage device discharge selection system 126C that is operable to manage energy storage devices of the energy storage device system 128, allowing selection of different energy storage devices for discharge to power the computing device 102 at different times. This may involve analyzing various criteria including static criteria for the computing device 102, dynamic system criteria for the computing device 102, and/or prediction criteria for the computing device 102. The static criteria, in contrast to the dynamic system criteria for the computing device 102, do not typically change while the computing device 102 operates. The static criteria for the computing device 102 refers to characteristics of the energy storage devices that are part of the energy storage device system 128, hardware included in and/or other physical characteristics of (such as the locations of hardware in) the computing device 102, characteristics of static software and/or firmware, static properties such as interconnect resistance or thermal zone layout (e.g., which devices are in which thermal zones) as discussed in more detail below, and so forth. The dynamic system criteria for the computing device 102 refers to characteristics of the energy storage devices that are part of the energy storage device system 128 and/or the computing device 102 that changes while the computing device 102 operates (e.g., runs the operating system 108 and one or more applications 110). The prediction criteria for the computing device 102 refers to estimated or predicted user behavior, program behavior, and/or more general usage of the computing device 102, such as removal or insertion of hot-swappable batteries that are part of the energy storage device system 128, connection of the computing device 102 to an AC power source, expected future workload and/or power usage of the computing device 102, and so forth. Connection of the computing device 102 to an AC power source refers to a connection or coupling allowing the computing device 102 to draw power from an external source to power the components of the computing device 102 and/or charge the energy storage devices. A power source can be connected to the computing device 102 via a wired connection and/or a wireless connection.

The energy storage device discharge selection system 126C can manage the energy storage devices by controlling modes of the energy storage device system 128, states of battery cells or other energy storage devices of the energy storage device system 128, availability of energy storage devices of the energy storage device system 128, and so forth. For example, the energy storage device discharge selection system 126C is operable to communicate control signals or otherwise interact with the energy storage device system 128 to direct operation of switching hardware to switch between energy storage devices to service the load in accordance with the analysis performed by the energy storage device discharge selection system 126C. Details regarding these and other aspects of dynamic energy storage device discharging are discussed in the following section.

The environment further depicts that the computing device 102 may be communicatively coupled via a network 130 to a service provider 132, which enables the computing device 102 to access and interact with various resources 134 made available by the service provider 132. The resources 134 can include any suitable combination of content and/or services typically made available over a network by one or more service providers. For instance, content can include various combinations of text, video, ads, audio, multi-media streams, applications, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Having described an example operating environment, consider now example details and techniques associated with one or more implementations of dynamic external power resource selection, dynamic energy storage device charging, and dynamic energy storage device discharging.

To further illustrate, consider the discussion in the following sections of example devices, components, procedures, and implementation details that may be utilized to provide dynamic external power resource selection, dynamic energy storage device charging, and dynamic energy storage device discharging as described herein. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Dynamic External Power Resource Selection System

Dynamic external power resource selection is described for a computing device having an energy storage device system with one or more energy storage devices. The energy storage devices can be charged by a variety of different power resources that can be connected to the computing device. A power resource refers to a power source and/or a power profile. A power source is a source of power, typically AC power, that can be used to charge the one or more energy storage devices of the computing device. A power profile refers to an amount of power that is provided by a power source. A power resource can support one or multiple different power profiles.

Various different criteria are used to determine which one or more of the multiple power resources to use to charge the energy storage devices at any given time. The criteria used to determine which one or more of the multiple power resources to use at any given time to charge the energy storage devices include static criteria, dynamic system criteria, and prediction criteria. The static criteria refers to physical characteristics of the energy storage devices and/or computing device that do not change while the computing device operates (e.g., while executing different programs). The dynamic system criteria refers to characteristics of the energy storage devices and/or the computing device that change while the computing device operates (e.g., while executing different programs). The prediction criteria refers to estimated or predicted user behavior (e.g., predicting the intent of the user), program behavior (e.g., predicting how the software installed is using/causing usage of the system, such as an antivirus service), and/or more general usage of the computing device, such as connection to a power resource.

These criteria are evaluated during operation of the computing device, and the appropriate power resources from which to draw power at any given time to charge the energy storage devices of the computing device are determined based on these criteria. The techniques discussed herein allow power to be drawn from the different power resources to charge the energy storage devices of the computing device in a manner that accommodates the particular computing device as well as the user's typical use of the computing device. Smarter decisions can be made regarding when to charge the energy storage devices and which power resources to draw power from, which can allow the computing device to be run on energy storage device power for a longer duration of time and can extend the lifespan of the energy storage devices.

Figure 2A:
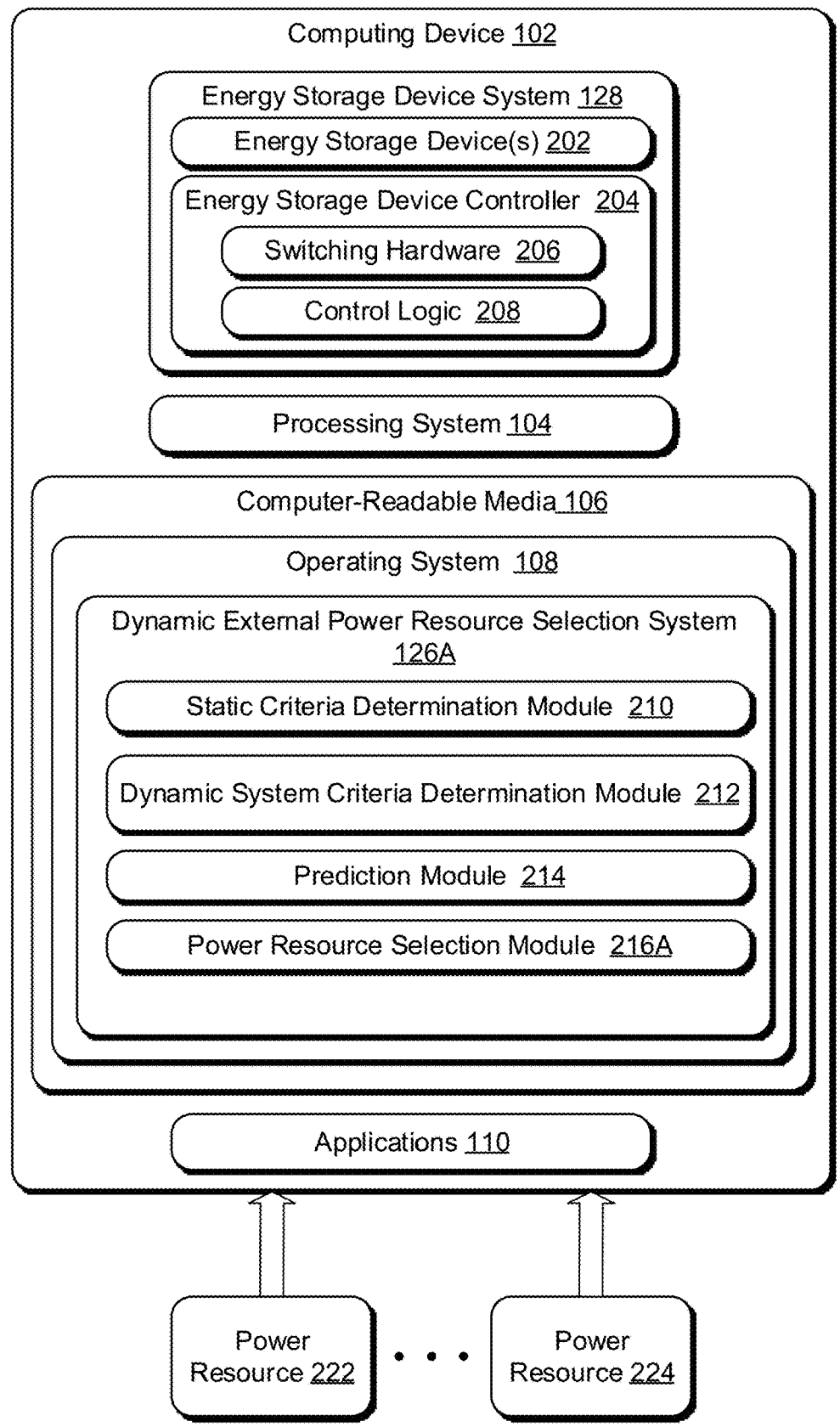
FIG. 2A depicts a computing device having an energy storage device system with one or more energy storage devices.

FIG. 2A depicts details of a computing device 102 having an energy storage device system 128 with one or more energy storage devices in accordance with one or more implementations. Computing device 102 also includes processing system 104, computer readable media 106, operating system 108 and applications 110 as discussed in relation to FIG. 1. In the depicted example, a dynamic external power resource selection system 126A is also shown as being implemented as a component of the operating system 108. It should be noted, however, that the dynamic external power resource selection system 126A can alternatively be implemented in other manners. For example, parts of (or all of) the dynamic external power resource selection system 126A can be implemented as part of the energy storage device system 128.

By way of example and not limitation, the energy storage device system 128 is depicted as having one or more energy storage devices 202 and an energy storage device controller 204. The energy storage devices 202 are representative of various different kinds of energy storage devices that may be included and/or compatible with the computing device 102. These energy storage devices can include, for example, individual or a collection of battery cells, supercapacitors, and so forth. Energy storage devices 202 can include energy storage devices that are designed to be included in and specifically work with the computing device 102 at the time of manufacture or distribution, and/or external energy storage devices (e.g., original equipment manufacturer (OEM) manufactured external batteries) that are added to the computing device 102 (e.g., by the user) at a later point in time. Energy storage devices 202 can include energy storage devices having different characteristics such as different sizes, capacities, chemistries, battery technologies, shapes, age, cycles, temperature, and so forth (heterogeneous energy storage devices). Accordingly, the energy storage device system 128 can include a diverse combination of multiple energy storage devices at least some of which can have different characteristics one to another. Alternatively, the energy storage devices 202 can include energy storage devices having the same characteristics. Various combinations of energy storage devices 202 may be utilized to provide a range of capacities, performance capabilities, efficiencies, power usage characteristics, and utilization of space in the device (e.g., for the purpose of balancing the weight, increasing energy storage capacity and/or energy storage characteristics), and so forth.

The energy storage device controller 204 is representative of a control system to control operation of the energy storage device system 128 and delivery of power from the energy storage devices 202 to service a system load of the computing device 102. The system load refers to the energy required by the computing device 102 at any given point in time in order to operate. The energy storage device controller 204 may be configured using various logic, hardware, circuitry, firmware, and/or software suitable to connect the energy storage devices 202 one to another, supply power to the system, switch between the energy storage devices, and so forth. By way of example and not limitation, the energy storage device controller 204 in FIG. 2A is depicted as including switching hardware 206 and control logic 208 that is operable to selectively switch between use of different designated sources of the energy storage devices 202 at different times. Control logic 208 may reflect different switching modes that switch between drawing power from different ones of the energy storage devices 202 so that power is drawn from ones of the energy storage devices 202 based on various criteria as determined by the energy storage device discharge selection system 126A. Thus, rather than merely interconnecting energy storage devices in parallel or series, switching hardware 206 can be utilized to set-up a switching scheme to select different energy storage devices based on different criteria for the computing device 102.

The computing device 102 can be connected to various different power resources 222, 224. Although two power resources 222, 224 are shown in FIG. 2A, the computing device 102 can be connected to any number of power resources. As discussed previously, a power resource refers to a power source and/or a power profile. A power source is a source of power, typically AC power, that can be connected to the computing device 102. A power source can be connected to the computing device 102 via a wired connection and/or a wireless connection. For a wired connection, the computing device 102 can provide various different power ports that can receive charging power from a power source. These power ports can be proprietary ports, or conform to various standards (e.g., a Universal Serial Bus (USB) port). A power profile refers to an amount of power that is provided by a power source. A power source can support one or multiple different power profiles. For example, a power source can support both a normal power profile that provides less power (e.g., a low voltage) and a rapid charging power profile that provides more power (e.g., a higher voltage than the normal power profile provides).

The power resources 222, 224 are external to the computing device 102. The power resources 222, 224 are separate from the energy storage devices 202 and are used to charge the energy storage devices 202.

It should be noted that although reference is made herein to an AC (Alternating Current) power source, DC (Direct Current) power is drawn from that power source (e.g., the AC power source). Furthermore, in some cases power is drawn in other manners, such as a wireless power source that transmits power as magnetized waves. The techniques discussed herein apply regardless of the nature of the power sources.

The dynamic external power resource selection system 126A includes a static criteria determination module 210, a dynamic system criteria determination module 212, a prediction module 214, and a power resource selection module 216A.

The static criteria determination module 210 represents functionality operable to determine values for various characteristics of the components included in and/or other physical characteristics of (such as the locations of hardware included in) the computing device 102, characteristics of static software and/or firmware, static properties such as interconnect resistance or thermal zone layout (e.g., which devices are in which thermal zones) as discussed in more detail below, and so forth.

In one or more embodiments, the static criteria includes an indication of proximity of power resources 222, 224 to the energy storage device(s) 202 in the computing device 102. The proximity of a power resource to an energy storage device refers to the electrical proximity between the power resource and the energy storage device. The proximity of a power resource to an energy storage device can be specified using various different values. In one or more embodiments, the proximity of a power resource to an energy storage device is specified by a value that represents the interconnect resistance between the power resource and the energy storage device. The interconnect resistance is a measure of the amount of resistance between a power resource and an energy storage device, and typically increases as the physical distance between the power resource and the energy storage device increases. Larger amounts of interconnect resistance result in larger amounts of power loss between the power resource and the energy storage device. Additionally or alternatively, the proximity of a power resource to an energy storage device is specified by a value that is the physical distance from the power resource to the energy storage device (e.g., as measured in centimeters or inches).

A different value representing the proximity of a power resource to an energy storage device is obtained for each power resource and energy storage device pair. The values representing the proximity of a power resource to an energy storage device can be obtained in a variety of different manners, such as from the supplier or manufacturer of the computing device 102, based on observations of charging the energy storage device using the power resource (e.g., by the operating system 108 and/or dynamic external power resource selection system 126A), and so forth.

The power resource selection module 216A can use the values representing the proximity of power resources to energy storage devices in various different manners. It should be noted that, although illustrated separately in FIG. 2A, at least part of the power resource selection module 216A can be implemented as part of the energy storage device 128. In situations in which the energy storage device 128 implements part of the power resource selection module 216A, part of the dynamic external power resource selection system 126A that is manifested in the operating system 108 is responsible for dictating policies (e.g., mode selection and energy storage device constraints settings) to the part of the dynamic external power resource selection system 126A manifested in the energy storage device 128.

In one or more embodiments, the power resource selection module 216A selects, to charge an energy storage device, a power resource that is most energy efficient for that energy storage device. For example, for a given energy storage device, the power resource selection module 216A can select as the most efficient energy storage device to charge the energy storage device the power resource having the smallest interconnect resistance to the energy storage device and/or the power resource having the smallest physical distance to the energy storage device.

In situations in which the energy storage device system 128 includes multiple energy storage devices 202, the power resource selection module 216A can use the values representing the proximity of power resources to energy storage devices to charge multiple energy storage devices 202 concurrently. In one or more embodiments, the power resource selection module 216A selects, for each of multiple energy storage devices, a power resource that is most energy efficient for that energy storage device to charge the energy storage device. For example, if the energy storage device system 128 includes two energy storage devices, energy storage device A and energy storage device B, the power resource selection module 216A can select to charge energy storage device A by a power resource X having the smallest interconnect resistance to the energy storage device A, and to charge energy storage device B by a power resource Y having the smallest interconnect resistance to the energy storage device B.

The dynamic system criteria determination module 212 represents functionality operable to determine values for various characteristics of the energy storage device(s) 202, the computing device 102, and/or the power resources 222, 224 that changes while the computing device 102 operates (e.g., while the computing device 102 runs the operating system 108 and one or more applications 110). The criteria used by the dynamic system criteria determination module 212 are referred to as dynamic because they change over time during operation of the computing device 102. For example, the criteria used by the dynamic system criteria determination module 212 can include the temperature of a thermal zone of a charging path from a power resource to an energy storage device, which changes over time during operation of the computing device 102, the ages of the energy storage devices 202, and so forth.

In one or more embodiments, the dynamic system criteria involve different thermal zones. A thermal zone refers to a group of one or more components (e.g., hardware) that are treated collectively for purposes of temperature control. Different thermal zones can optionally have different cooling mechanisms, such as vents, fans, heat sinks, and so forth. The dynamic external power resource selection system 126A can obtain an indication of which components are in which thermal zones in various manners, such as from the supplier or manufacturer of the computing device 102. In one or more embodiments in which the computing device 102 supports the ACPI Specification, such as the ACPI Specification, Version 6.1 (January, 2016), the dynamic external power resource selection system 126A can obtain an indication of the thermal zones, and optionally which components are in which thermal zones, by invoking methods of the ACPI.

The charging path from a power resource to an energy storage device includes multiple components: the power resource, the energy storage device, and optionally one or more additional components that the power passes through when being routed from the power resource to the energy storage device. Each of the components in the charging path can be included in the same thermal zone, or alternatively different components of the charging path can be included in different thermal zones. The power resource selection module 216A can select power resources to draw power from to charge energy storage device(s) 202 based on thermal activity along these charging paths.

In one or more embodiments, the dynamic system criteria includes an indication, for each pair of power resource and energy storage device, of whether the charging path between the power resource and the energy storage device is in a thermally hot (also referred to as thermally active) zone. The dynamic system criteria determination module 212 can obtain indications of temperatures of the different thermal zones in various manners, such as via the ACPI, by accessing temperature gauge components in the computing device 102, and so forth. A thermal zone is referred to as a hot zone or a thermally hot zone if the temperature of the thermal zone satisfies (e.g., is the same as, is the same as or equal to) a threshold temperature. In one or more embodiments, the threshold temperature is a value above which the designer or supplier of the computing device 102 prefers that the thermal zone not run. The threshold temperature can be, for example, a particular temperature (e.g., 85 degrees Fahrenheit), or a relative value (e.g., 80% of a maximum operating temperature of the computing device 102 as specified by the designer or supplier of the computing device 102).

A value for each charging path can be generated based on whether the charging path is in a thermally hot zone. For example, a value of 1 or True can be used to indicate that the charging path includes one or more components in a thermally hot zone, and thus that the charging path is in a thermally hot zone. A value of 0 or False can be used to indicate that the charging path includes no components in a thermally hot zone (which may also be referred to as a thermally stable zone), and thus that the charging path is not in a thermally hot zone.

The power resource selection module 216A can use the values indicating which charging paths are in a thermally hot zone and which charging paths are not in a thermally hot zone in various different manners. In one or more embodiments, the power resource selection module 216A selects a charging path that is not in a thermally hot zone (also referred to as being in a thermally stable zone), and configures the energy storage devices 128 to charge the energy storage device using the power resource from the selected charging path. The temperatures of components in the charging path typically increase as current is provided to the energy storage device, and by selecting a charging path that includes no components in a thermally hot zone the dynamic external power resource selection system 126A facilitates managing thermal stability of the computing device 102 (e.g., keeping a thermal zone of the computing device 102 from getting too hot) when selecting which power resource to use to charge an energy storage device.

In situations in which there are multiple power resources connected to the computing device 102 that can be used to charge the energy storage device(s) 202. In such situations, a single power resource can be used to provide power to charge an energy storage device 202. Alternatively, such as in situations in which all charging paths to an energy storage device to be charged include a component in a thermally hot zone, the power used to charge the energy storage device can be provided by multiple different power resources. The different power resources can be duty cycled, with different ones of the power resources providing the power used to charge the energy storage device at different times.

In one or more embodiments, the dynamic system criteria includes an indication of which power resources are connected to the computing device 102 and can be used to charge the energy storage device(s) 202 at any given time. A value for each power resource is determined. Different integers (e.g., 1, 2, 3, etc.) or other labels can be used as the value for each power resource. Alternatively, a value for each power resource can be generated based on, for example, how recently or some duration that current has been provided by the power resource to an energy storage device for charging. This value can take various forms, such as a number of milliseconds, one value (e.g., 1 or True) to indicate that current has recently been provided by the power resource and another value (e.g., 0 or False) to indicate that current has not recently been provided by the power resource, and so forth.

The power resource selection module 216A can use the values indicating the different power resources in various different manners. In one or more embodiments, the power resource selection module 216A uses the values to select a power resource, duty cycling the multiple power resources (e.g., duty cycling power source and/or power profiles). The temperature of components in a charging path typically increases as current is provided to the energy storage device for charging, so by duty cycling the power resources different charging paths are used and the increase in heat as a result of charging the energy storage devices is spread across the components in the different charging paths. For example, if there are three power resources, the power resource selection module 216A selects a first of the three power resources for charging the energy storage device for a particular amount of time (e.g., 5 seconds), then selects a second of the three power resources for charging the energy storage device for a particular amount of time (e.g., 5 seconds), then selects a third of the three power resources for charging the energy storage device for a particular amount of time (e.g., 5 seconds), then selects the first of the three power resources for charging the energy storage device for a particular amount of time (e.g., 5 seconds), and so forth.

The power resource selection module 216A can additionally or alternatively select power resources to draw power from to charge energy storage device(s) 202 based on other thermal activity along the charging paths. In one or more embodiments, the power resource selection module 216A starts and stops charging of an energy storage device based on performance of the computing device 102. The performance of the computing device 102 can be measured in a variety of different manners, such as the performance of a central processing unit (e.g., a speed or utilization of the central processing unit), the performance of graphics processing unit (e.g., a speed or utilization of the graphics processing unit), the amount of memory load or usage in the computing device 102, and so forth. If the computing device 102 is in a high performance state (e.g., a graphics or central processing unit is running at a threshold frequency or higher (e.g., 1.2 gigahertz), a graphics or central processing unit is running at a threshold utilization or higher (e.g., 50% utilization), etc.) and mitigation of thermal activity is desired (e.g., due to the current thermal activity), then the power resource selection module 216A stops charging the energy storage device. This alleviates any increase in temperature of the energy storage device (and the charging path to the energy storage device) due to charging of the energy storage device, and prioritizes computing device performance over energy storage device charging when the computing device is operating in a high performance state.

However, if the computing device 102 is not in a high (e.g., the highest) performance state (e.g., a graphics or central processing unit is running at less than a threshold frequency (e.g., 1.2 gigahertz), a graphics or central processing unit is running at less than a threshold utilization (e.g., 50% utilization), etc.), then the power resource selection module 216A starts or resumes charging the energy storage device. This prioritizes energy storage device charging over computing device performance when the computing device is operating in a low performance state.

Additionally or alternatively, the power resource selection module 216A can duty cycle charging and throttling of performance states. Throttling performance states refers to reducing the performance of hardware and/or software components. Reducing the performance of a hardware component refers to reducing the amount of heat generated by the component, typically by running the hardware component at a slower frequency or rate. For example, the performance of a processing unit can be reduced by slowing the frequency at which the processing unit runs (e.g., from 1.2 gigahertz (GHz) to 800 megahertz (MHz)). Reducing the performance of software components can be done in various manners, such as by limiting performance, by putting resource constraints and/or budget on the software (currently in operation or due to run in the future), by means of suspending operation (by means of postponing running of software or cancelling it all together), combinations thereof, and so forth.

By duty cycling charging and throttling of performance states, the power resource selection module 216A alternates between charging the energy storage devices and running the hardware and/or software components in a high performance state. By not charging the energy storage devices at the same time as the hardware and/or software components are run in a high performance state, the amount of heat in the computing device 102 is reduced.

The prediction module 214 represents functionality operable to determine values for various characteristics of estimated or predicted user behavior (e.g., predicting the intent of the user), program behavior (e.g., predicting how the software installed is using/causing usage of the system, such as an antivirus service), and/or more general usage of the computing device 102. This predicted behavior or usage can include, for example, timing of connection of the computing device 102 to a power resource, duration of connection of the computing device 102 to a power resource, power profile(s), combinations thereof, and so forth.

In one or more embodiments, the estimated or predicted usage of the computing device includes a timing of when the computing device 102 is predicted to be connected to a power resource and a predicted duration of the connection of the computing device 102 to the power resource. A value is determine indicating an amount of time until the computing device is predicted to be connected to a power resource, such as a value that is a number of seconds or minutes. Another value is determined indicating a time duration that the computing device 102 is predicted to be connected to a power resource, such as a value that is a number of seconds or minutes. By way of another example, various non-binary values can be used. For example, values indicating how much power can be delivered by the power resource that the computing device is predicted to be connected to can be generated, values indicating how long the computing device is expected to be connected to the power resource can be generated, values indicating how much energy is expected to be drawn from the power resource for the duration that the computing device is connected to the power resource can be generated, and so forth.

The power resource selection module 216A can use these values in various different manners. In one or more embodiments, if the computing device is predicted to be connected to a power resource for a small amount of time in the near future and the amount of charge remaining in the energy storage devices is below a threshold amount, then the power resource selection module 216A selects to thermally condition the computing device to reduce the temperature of the computing device. The power resource selection module 216A can select to thermally condition the computing device if the energy storage device(s) of the computing device is in a thermally hot zone, or alternatively regardless of the current temperature of any thermal zones of the computing device. By thermally conditioning the computing device and reducing the temperature of the computing device, the power resource selection module 216A readies the computing device for the predicted upcoming connection to the power resource. Because the temperature of the computing device has been reduced, the charging of the energy storage device can contribute to a greater rise in the temperature of the computing device while not resulting in the thermal zone that includes the energy storage device being a thermally hot zone.

Various actions can be taken to thermally condition the computing device, such as turning on active cooling mechanisms (e.g., fans), lowering the performance state of the computing device 102 (e.g., reducing the frequency at which a central processing unit runs, disabling a graphics processing unit), and so forth.

The computing device being predicted to be connected to a power resource in the near future refers to the computing device being predicted to be connected to a power resource within some threshold amount of time of the current time. This threshold amount of time can be on the order of minutes or hours, such as 10 minutes or 2 hours.

The computing device being predicted to be connected to a power resource for a small amount of time refers to an amount of amount of time that is less than a threshold amount of time, which can be a fixed amount of time (e.g. 5 minutes) or a percentage (e.g., 25% of an estimated amount of time to fully charge an energy storage device in the computing device in light of its current charge level).

Additionally or alternatively, the power resource selection module 216A can use the value indicating the amount of time until the computing device 102 is predicted to be connected to a power resource and/or the value indicating the time duration that the computing device 102 is predicted to be connected to a power resource in other manners. In one or more embodiments, if the computing device 102 is connected to a power resource but the thermal zone including the energy storage device is thermally hot and the amount of charge remaining in the energy storage devices is predicted to sustain powering the computing device 102 until the computing device 102 is next connected to a power resource, then the power resource selection module 216A determines not to charge the energy storage device. By not charging the energy storage device, the temperature of the thermal zone including the energy storage device is not further increased as a result of charging the energy storage device, thus prioritizing running desired workloads (e.g., executing applications desired by the user of the computing device 102) by the computing device over charging the energy storage device.

However, if the computing device 102 is connected to a power resource and the thermal zone including the energy storage device is thermally hot but the amount of charge remaining in the energy storage devices is not predicted to sustain powering the computing device 102 until the computing device 102 is next connected to a power resource, then the power resource selection module 216A determines to charge the energy storage device. This effectively prioritizes charging the energy storage device over running desired workloads, but is deemed appropriate by the power resource selection module 216A because the amount of charge remaining in the energy storage devices is not predicted to sustain powering the computing device 102 until the computing device 102 is next connected to a power resource.

The prediction module 214 can estimate or predict when the computing device is to be connected to a power resource and a time duration of the connection in a variety of different manners. In one or more embodiments, the prediction module 214 maintains a record (e.g., over a matter of weeks or months) indicating times of the day and/or days of the week that the computing device is connected to a power resource. From this record, the prediction module 214 can identify usage patterns that indicate when the computing device is connected to a power resource and the time durations when the computing device is connected to a power resource. Any of a variety of public and/or proprietary techniques can be used to analyze the record to identify these usage patterns.

For example, if every Sunday (or at least a threshold number of Sundays, such as 80%) from noon to midnight the computing device is connected to a power resource, then the prediction module 214 can predict that on the following Sunday at noon the computing device will be connected to a power resource for 12 hours. By way of another example, if every day of the week (or at least a threshold number of days, such as 75%) from 1:00 pm to 2:30 pm the computing device is connected to a power resource, then if the current time is 12:45 pm, the prediction module 214 can predict that in 15 minutes the computing device will be connected to a power resource for 1½ hours.

Additionally or alternatively, the prediction module 214 can when the computing device is to be connected to a power resource and/or a time duration of the connection based on any of a variety of other data. The prediction module 214 can obtain data from various different sources and analyze the data using any of a variety of public and/or proprietary techniques to identify expected future usage patterns.

By way of example, the prediction module 214 can obtain data from a calendar of the user of the computing device 102. The past usage data (the record indicating times of the day and/or days of the week that the computing device connected to a power resource) can be compared to the user's calendar and a determination made that during meetings (or meetings at particular locations) the computing device is connected to a power resource. The prediction module 214 can predict, for example, that the computing device will be connected to a power resource for the duration of upcoming meetings (or meetings at particular locations) identified in the user's calendar.

By way of another example, the prediction module 214 can obtain location data for the computing device 102, such as from a location awareness module of the computing device 102 (e.g., using a global positioning system (GPS), Bluetooth, Wi-Fi, triangulation, etc.). The past usage data (the record indicating times of the day and/or days of the week that the computing device connected to a power resource) can be compared to the user's locations and a determination made that at certain locations (e.g., home) the computing device is connected to a power resource. The prediction module 214 can predict, for example, that the computing device will be connected to a power resource for more than a small amount of time if the user is at home, but that the computing device will be connected to a power resource for a small amount of time if the user is not at home and heading towards work (based on calendar entries, meeting appointments, etc.).

By way of another example, the prediction module 214 can obtain data from a cloud service that collects usage data for computing devices. The cloud service can provide an indication of, for various times of the day and/or days of the week, the duration that users of computing devices of the same type as computing device 102 have their computing devices connected to a power resource. The prediction module 214 can predict, for example, that the computing device 102 will be connected to a power resource for those durations at those times of the day and/or days of the week indicated by the cloud service.

The prediction module 214 can predict whether the amount of charge remaining in the energy storage devices is sufficient to sustain powering the computing device 102 until the computing device 102 is next connected to a power resource in a variety of different manners. In one or more embodiments, the prediction module 214 makes this prediction based on expected future workload and/or power usage of the computing device 102. The expected future workload and/or power usage of the computing device 102 until the computing device 102 is predicted to next be connected to a power resource is determined and is used as a threshold charge amount. A determination is made as to whether there is sufficient charge in the energy storage devices to perform the expected future workload and/or power usage of the computing device 102 (e.g., whether the remaining charge in the energy storage devices is greater than the threshold charge amount).

The prediction module 214 can estimate or predict the expected future workload and/or power usage of the computing device 102 in a variety of different manners. In one or more embodiments, the prediction module 214 maintains a record (e.g., over a matter of weeks or months) indicating times of the day and/or days of the week and the power usage during those times and/or days. From this record, the prediction module 214 can identify usage patterns that indicate power usage of the computing device 102. Any of a variety of public and/or proprietary techniques can be used to analyze the record to identify usage patterns based on time and/or day. Additionally or alternatively, the prediction module 214 maintains a record of applications run on the computing device 102 and the power usage while those applications are run. From this record, the prediction module 214 can identify usage patterns that indicate power usage of the computing device 102 based on application(s) running. Any of a variety of public and/or proprietary techniques can be used to analyze the record to identify usage patterns.

For example, if every Monday (or at least a threshold number of Mondays, such as 80%) from 7:00 am to 10:00 am a particular amount of power (e.g., 1500 milliamp hours (mAh)) is used, then the prediction module 214 can predict that on the following Monday from 7:00 am to 10:00 am the computing device will use that same particular amount of power (e.g., 1500 mAh). By way of another example, if every day of the week (or at least a threshold number of days, such as 75%) from noon to 1:00 pm the computing device uses a particular amount of power (e.g., 30 mAh), then the prediction module 214 can predict that, if it is currently 11:00 am, the computing device will use 30 mAh from noon to 1:00 pm today. By way of yet another example, if every time (or at least a threshold number of times, such as 70%) an image processing application is run on the computing device the computing device uses 1000 milliamps per hour (mA/h), then the prediction module 214 can predict that, if that image processing is currently running on the computing device then the computing device will currently use 1000 mA/h.

Additionally or alternatively, the prediction module 214 can estimate or predict the expected future workload and/or power usage of the computing device 102 based on any of a variety of other data. The prediction module 214 can obtain data from various different sources and analyze the data using any of a variety of public and/or proprietary techniques to identify expected future usage patterns.

By way of example, the prediction module 214 can obtain data from a calendar of the user of the computing device 102. The past usage data (the record indicating times of the day and/or days of the week and the power usage during those times and/or days) can be compared to the user's calendar and a determination made that during meetings (or meetings at particular locations) the computing device uses a particular amount of power (e.g., 50 mA/h). The prediction module 214 can predict, for example, that the computing device will also use 50 mA/h during upcoming meetings (or meetings at particular locations) identified in the user's calendar, or more than 50 mA/h (e.g., 70 mA/h) if the user is marked as meeting presenter.

By way of example, the prediction module 214 can obtain data from a calendar and/or digital personal assistant (e.g., the Cortana® personal assistant) of the user of the computing device 102. The prediction module 214 can predict, given this obtained data, when the user will be away from the computing device 102 (e.g., for a meeting, for coffee, etc.). The prediction module 214 can further predict, for example, that the computing device will use a small amount of power (e.g., 5 mA/h) while the user is away from the computing device 102.

By way of example, the prediction module 214 can obtain location data for the computing device 102, such as from a location awareness module of the computing device 102. The past usage data (the record indicating times of the day and/or days of the week and the power usage during those times and/or days) can be compared to the user's locations and a determination made that at certain locations (e.g., home) the computing device uses a particular amount of power (e.g., 100 mA/h). The prediction module 214 can predict, for example, that the computing device will also use 100 mA/h when the user is next at home.

By way of example, the prediction module 214 can obtain data from a cloud service that collects usage data for computing devices. The cloud service can provide an indication of times of the day and/or days of the week and the power usage during those times and/or days for other computing devices of the same type as computing device 102. The prediction module 214 can predict, for example, that the computing device will use similar or the same amount of power during those times of the day and/or days of the week indicated by the cloud service.

Given the information from the static criteria determination module 210, the dynamic system criteria determination module 212, and/or the prediction module 214, the power resource selection module 216A can readily select which power resources 222, 224 to use to charge which energy storage device(s) 202 at any particular time. The determination of which power resources 222, 224 to use to charge which energy storage device(s) 202 at various times, such as at regular or irregular intervals (e.g., some time duration), in response to certain events (e.g., the computing device 200 being newly connected to a power resource), and so forth.

In one or more embodiments, the power resource selection module 216A uses the individual criteria as discussed above. The energy storage device selection module 216A can use individual criteria or alternatively any combination of criteria. Additionally or alternatively, the power resource selection module 216A can apply various different rules or algorithms to determine which power resources 222, 224 to use to charge which energy storage device(s) 202 at any given time.

In one or more embodiments, the power resource selection module 216A attempts to satisfy all the criteria used by the dynamic external power resource selection system 126A. Although various criteria are discussed herein, it should be noted that not all of the criteria discussed herein need be used by the dynamic external power resource selection system 126A. Additionally or alternatively, additional criteria can also be used by the dynamic external power resource selection system 126A.

If all of the criteria used by the dynamic external power resource selection system 126A can be satisfied, then the power resource selection module 216A selects which power resources 222, 224 to use to charge which energy storage device(s) 202 at any given time so that all the criteria used by the dynamic external power resource selection system 126A are satisfied. However, situations can arise where all of the criteria cannot be satisfied. For example, the most energy efficient charging path to an energy storage device from the power resource may be in a thermally hot zone, so one criteria may indicate to use that power resource but another criteria indicates not to use that power resource.

In one or more embodiments, each criteria is assigned a different classification. Various different classification levels with various different labels can be used, and these classification levels can be assigned statically and/or dynamically. Any of a variety of different classification names or labels can be used. One example of classification levels is (in order of priority or importance) critical, important, and informational. Other classification levels or labels can alternatively be used, such as a number or an "importance" value (e.g., 0 through 100). Higher classification levels are given priority over lower classification levels. For example, assume that proximity of power resources to the energy storage devices is given a classification level of important, and the charging path being in a thermally stable zone is given a classification level of critical (which is higher than important). If the most energy efficient power resource for a particular energy storage device is in a thermally hot zone, then the power resource selection module 216A selects a power resource to charge the particular energy storage device other than the most energy efficient power resource because selecting a charging path in a thermally stable zone is given priority over selecting the most energy efficient power resource.

In one or more embodiments, situations can also arise in which criteria at the same classification level conflict with one another. Such situations can be resolved in various manners, such as by using priority levels assigned to the different criteria. These priority levels can be assigned statically and/or dynamically. Any of a variety of different priority names or labels can be used. One example of labels is (in order of priority or importance) high, medium, and low. If two different criteria having the same classification level conflict (e.g., one criteria indicates that a particular energy storage device should be used and another indicates that particular energy storage device should not be used), then the power resource selection module 216A applies the criteria having the higher priority. However, if two different criteria having the same priority level but different classification levels conflict, then the power resource selection module 216A applies the criteria having the higher classification level.

The evaluation of classifications levels and priority levels can alternatively be performed in the reverse order. For example, if two different criteria conflict (e.g., one criteria indicates that a particular energy storage device should be used and another indicates that particular energy storage device should not be used), then the energy storage device selection module 216A applies the criteria having the higher priority. Situations can arise in which criteria at the same priority level conflict with one another. Such situations can be resolved in various manners, such as by using classification levels assigned to the different criteria. E.g., if two different criteria having the same priority level conflict (e.g., one criteria indicates that a particular energy storage device should be used and another indicates that particular energy storage device should not be used), then the energy storage device selection module 216A applies the criteria having the higher classification level.

The techniques discussed herein provide a dynamic approach to selecting which of multiple power resources to use to charge energy storage devices. This dynamic approach varies based on multiple different criteria, and can factor in the way in which a user uses his or her computing device. Thus, rather than having a one-size-fits-all approach to selecting a power resource to charge an energy storage device, the dynamic approach discussed herein is customized or tailored to the individual user. This results in improved performance and improved thermal stability of the computing device.

It should be noted that although various different values, labels, levels, and so forth are discussed herein, these are examples and the techniques discussed herein are not limited to these examples. For example, any specific threshold values and/or labels discussed herein are only examples, and various other threshold values and/or labels can additionally or alternatively be used. These examples are illustrations only and are not intended to limit the scope of the techniques discussed herein.

Figure 2B:
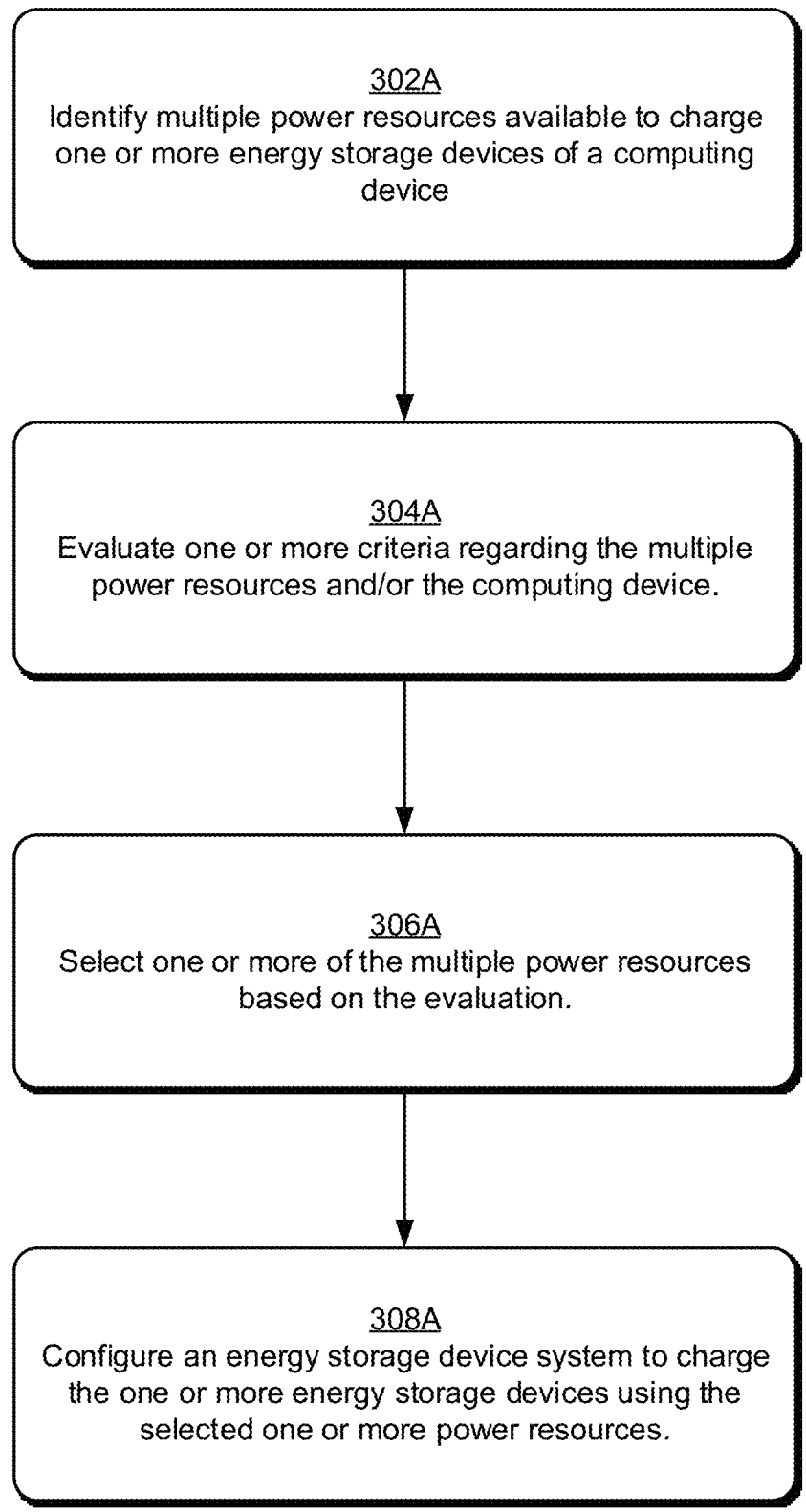
FIG. 2B is a flow diagram of an example procedure for dynamic external power resource selection.
Figure 2C:
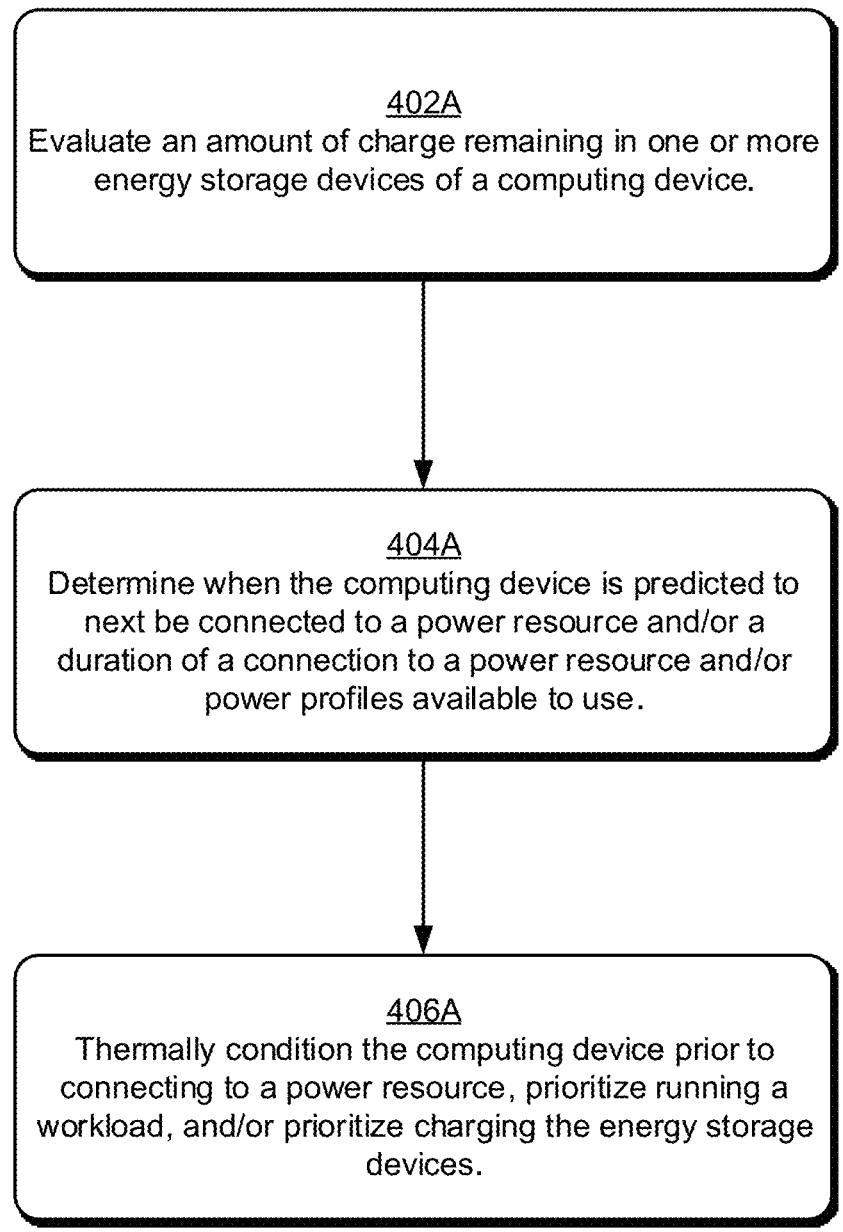
FIG. 2C is a flow diagram of another example procedure for dynamic external power resource selection.

Further aspects of the dynamic external power resource selection techniques are discussed in relation to example procedures of FIGS. 2B and 2C. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks.

FIG. 2B is a flow diagram that describes details of an example procedure for dynamic external power resource selection in accordance with one or more implementations. The procedure describes details of selecting a power resource. The procedure can be implemented by way of a suitably configured computing device, such as by way of an operating system 108, dynamic external power resource selection system 126A, and/or other functionality described in relation to the examples of FIGS. 1 and 2A.

Multiple power resources available to charge one or more energy storage devices of computing device are identified (block 302A). Which power resources are connected to the computing device, whether wired or wirelessly, can vary over time. When connected, the connection can be readily identified based on the protocol or standard used by the power resource.

One or more criteria regarding the multiple power resources and/or the computing device are evaluated (block 304A). Various criteria can be evaluated as described above. For example, thermal activity along a charging path from the power resources to the energy storage device can be evaluated, the electrical proximity of the power resources to the energy storage device can be evaluated, and so forth. Additionally, user convenience may be factored in, such as it may be sub optimal to use a wireless charging source, but it is more convenient to the user to use a wireless charging source because it requires less work on user's part, and so forth.

One or more of the multiple power resources are selected based on the evaluation (block 306A). The selected power resource is, for example, the power resource that is most energy efficient for the energy storage device to which power is to be provided. An energy storage device system is configured to charge the one or more energy storage devices using the selected one or more power resources (block 308A). This configuration routes power to the one or more energy storage devices, charging the one or more energy storage devices.

FIG. 2C is a flow diagram that describes details of an example procedure 400A for dynamic external power resource selection in accordance with one or more implementations. The procedure 400A describes details of selecting a power resource. The procedure 400A can be implemented by way of a suitably configured computing device, such as by way of an operating system 108, dynamic external power resource selection system 126A, and/or other functionality described in relation to the examples of FIGS. 1 and 2A.

An amount of charge remaining in one or more energy storage devices of a computing device is evaluated (block 402A). This evaluation can include determining an amount of charge remaining in the one or more energy storage devices can be made in various manners, such as querying the energy storage device or the energy storage device controller.

When the computing device is predicted to next be connected to a power resource and/or a duration of the connection to a power resource and/or power profiles available to use is determined (block 404A). Various different data can be analyzed to determine these prediction(s) and/or available power profiles as discussed above. Any one or any combination of these predictions(s) and/or power profile availabilities can be determined in act 404A.

Based on the determination in block 404A, the computing device is thermally conditioned prior to connecting the computing device to a power resource, running a workload (e.g., a performance intensive workload) is prioritized, and/or charging the energy storage device is prioritized (block 406A). Various different actions can be taken in block 406A based on various different factors, such as whether the energy storage device is thermally hot, whether the amount of charge remaining in the energy storage devices is predicted to sustain powering the computing device until the computing device is next connected to a power resource, and so forth.

Energy Storage Device Selection System

Dynamic energy storage device charging is described for a computing device having an energy storage device system with multiple energy storage devices. These multiple energy storage devices can be the same types of energy storage devices or alternatively different types of energy storage devices having various different characteristics such as different sizes, capacities, technologies, chemistries, shapes, age, cycles, temperature, and so forth. Various different criteria are used to determine which one or more of the multiple energy storage devices to charge at any given time.

The criteria used to determine which one or more of the multiple energy storage devices to charge at any given time include static criteria, dynamic system criteria, and prediction criteria. The static criteria refers to characteristics of the energy storage devices as well as hardware and/or physical characteristics of the computing device that do not change while the computing device operates (e.g., while executing different programs). The dynamic system criteria refers to characteristics of the energy storage devices and/or the computing device that changes while the computing device operates (e.g., while executing different programs). The prediction criteria refers to estimated or predicted user behavior (e.g., predicting the intent of the user), program behavior (e.g., predicting how the software installed is using/causing usage of the system, such as an antivirus service), and/or more general usage of the computing device, such as removal of hot-swappable batteries, duration of connection to an AC power source, workload and/or power usage of the computing device, and so forth.

These criteria are evaluated during operation of the computing device, and the appropriate energy storage device(s) to charge at any given time based on these criteria are determined. The techniques discussed herein allow the multiple energy storage devices to be charged in a manner that accommodates the particular computing device as well as the user's typical use of the computing device. Smarter decisions can be made regarding which energy storage device to charge, which can allow the computing device to be run on energy storage device power for a longer duration of time and can extend the lifespan of the energy storage devices.

Figure 3A:
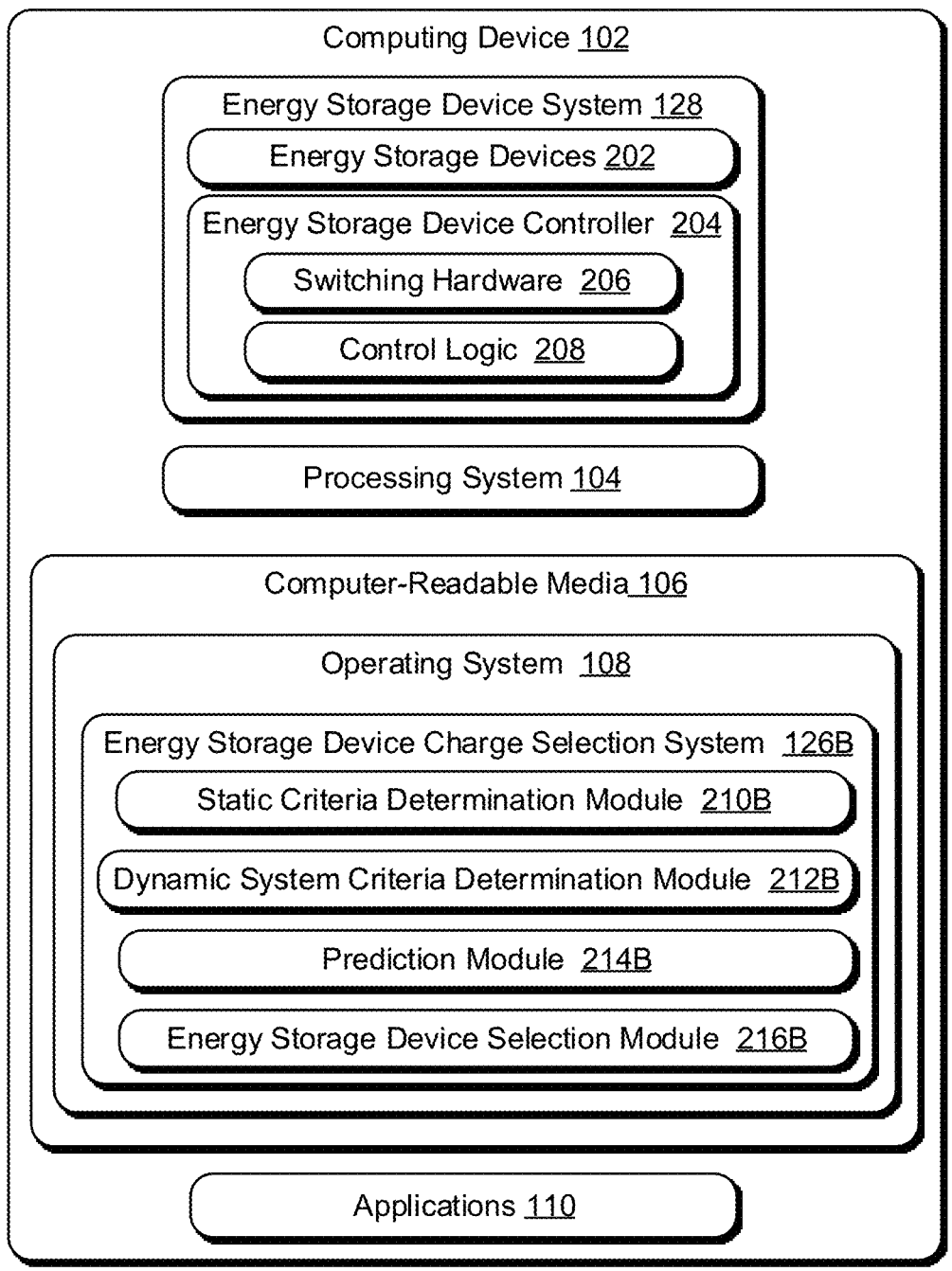
FIG. 3A depicts a computing device having an energy storage device system with multiple energy storage devices.

FIG. 3A depicts details of a computing device 102 having an energy storage device charge selection system 126A. The energy storage device charge selection system 126B is shown as being implemented as a component of the operating system 108. It should be noted, however, that the energy storage device charge selection system 126B can alternatively be implemented in other manners. For example, parts of (or all of) the energy storage device charge selection system 126B can be implemented as part of the energy storage device system 128.

The energy storage device system 128 and its components are described above. However, functionality provided by the dynamic external power resource selection system 126A may instead be provided by the energy storage device charge selection system 126B.

The energy storage device charge selection system 126B includes a static criteria determination module 210B, a dynamic system criteria determination module 212B, a prediction module 214B, and an energy storage device selection module 216B.

The static criteria determination module 210B represents functionality operable to determine values for various characteristics of the energy storage devices 202, as well as hardware components included in and/or other physical characteristics of (such as the locations of hardware included in) the computing device 102, characteristics of static software and/or firmware, static properties such as interconnect resistance or thermal zone layout (e.g., which devices are in which thermal zones) as discussed in more detail below, and so forth. These hardware components can include, for example, components of the processing system 104.

In one or more embodiments, the static criteria includes an energy storage device charge level. For many energy storage devices, the efficiency of the energy storage device charging degrades as the energy storage device is charged. Thus, an energy storage device when 25% charged can be charged more efficiently than when the energy storage device has an 85% charge. A threshold charge level is set, and whether the energy storage device has satisfied the threshold charge level (e.g., has a charge level at and/or greater than the threshold charge level) is determined. A value for the energy storage device charge level criteria is generated based on whether the energy storage device has satisfied the threshold charge level. For example, a value of 1 or True can be used to indicate that the energy storage device has satisfied the threshold charge level, and a value of 0 or False can be used to indicate that the energy storage device has not satisfied the threshold charge level.

The threshold charge level can be set in a variety of different manners, such as based on an energy storage device charge curve. The energy storage device charge curve is a plot of amount of charge (remaining charge) versus time for the energy storage device as the energy storage device charges. The charge curve drops slower (has a less negative slope) at later times in the plot than at earlier times. That is, the charge curve drops slower the higher the remaining charge is in the energy storage device. Different energy storage devices can have different charge curves. The threshold charge level can be set based on the charge curve, such as when the charge curve starts to drop at a particular rate (e.g., starts to drop at a rate that is 10% slower than the highest rate, has a slope of −0.1, etc.). The charge curve can be obtained in a variety of different manners, such as from the supplier or manufacturer of the energy storage device, based on observations of charging the energy storage device by the computing device 102 (e.g., by the operating system 108 and/or energy storage device charge selection system 126B), and so forth.

The energy storage device selection module 216B can use the threshold charge level in various different manners. In one or more embodiments, the energy storage device selection module 216B selects for a component an energy storage device to power that component that satisfies the threshold charge level for that energy storage device.

In one or more embodiments, the static criteria includes an identification of charge paths in the computing device 102. A charge path is a route for current between a power source and an energy storage device 202 being charged by that power source. The identification of the charge path can include, for example, an indication of which components are included in the charge path, which thermal zones of the computing device the charging path passes through, and so forth.

The energy storage device selection module 216B can use the identification of the charge paths in various different manners. For example, in conjunction with the identification of thermally hot zones as discussed in more detail below, the energy storage device selection module 216B can select to charge energy storage devices 202 having charge paths that do not pass through a thermally hot zone.

The dynamic system criteria determination module 212B represents functionality operable to determine values for various characteristics of the energy storage devices 202 and/or of the computing device 102 that changes while the computing device 102 operates (e.g., while the computing device 102 runs the operating system 108 and one or more applications 110). The criteria used by the dynamic system criteria determination module 212B are referred to as dynamic because they change over time during operation of the computing device 102. For example, the criteria used by the dynamic system criteria determination module 212B can include the temperature of a thermal zone of the computing device 102, which changes over time during operation of the computing device 102, the ages of the energy storage devices 202, and so forth.

In one or more embodiments, the dynamic system criteria involve different thermal zones in the computing device 102. A thermal zone refers to a group of one or more components (e.g., hardware) in the computing device 102 that are treated collectively for purposes of temperature control. Different thermal zones can optionally have different cooling mechanisms, such as vents, fans, heat sinks, and so forth. The energy storage device charge selection system 126B can obtain an indication of which components of the computing device 102 are in which thermal zones in various manners, such as from the supplier or manufacturer of the computing device 102. In one or more embodiments in which the computing device 102 supports the ACPI Specification, such as the ACPI Specification, Version 6.1 (January, 2016), the energy storage device charge selection system 126B can obtain an indication of the thermal zones in the computing device 102, and optionally which components of the computing device 102 are in which thermal zones, by invoking methods of the ACPI.

In one or more embodiments, the dynamic system criteria includes an indication of whether each of the energy storage devices 202 is in a thermally hot (also referred to as thermally active) zone. The dynamic system criteria determination module 212B can obtain indications of temperatures of the different thermal zones in the computing device 102 in various manners, such as via the ACPI, by accessing temperature gauge components in the computing device 102, and so forth. A thermal zone is referred to as a hot zone or a thermally hot zone if the temperature of the thermal zone satisfies (e.g., is the same as, is the same as or equal to) a threshold temperature. In one or more embodiments, the threshold temperature is a value above which the designer or supplier of the computing device 102 prefers that the thermal zone not run. The threshold temperature can be, for example, a particular temperature (e.g., 85 degrees Fahrenheit), or a relative value (e.g., 80% of a maximum operating temperature of the computing device 102 as specified by the designer or supplier of the computing device 102).

The dynamic system criteria determination module 212B can also obtain an indication of which components, including which energy storage devices 202, are in which thermal zones. A value for each energy storage device can be generated based on whether the energy storage device is in a thermally hot zone. For example, a value of 1 or True can be used to indicate that the energy storage device is in a thermally hot zone, and a value of 0 or False can be used to indicate that the energy storage device is not in a thermally hot zone (which may also be referred to as a thermally stable zone).

The energy storage device selection module 216B can use the values indicating which energy storage devices are in a thermally hot zone and which energy storage devices are not in a thermally hot zone in various different manners. In one or more embodiments, the energy storage device selection module 216B selects an energy storage device that is not in a thermally hot zone for charging. The temperature of an energy storage device typically increases as current is provided to the energy storage device, and by selecting an energy storage device that is not in a thermally hot zone the energy storage device charge selection system 126B facilitates managing thermal stability of the computing device 102 (e.g., keeping a thermal zone of the computing device 102 from getting too hot) when selecting which energy storage devices 202 to charge.

In one or more embodiments, the dynamic system criteria includes an indication of which thermal zones the energy storage devices 202 are in. A value for each energy storage device that is the thermal zone the energy storage device 202 is in (e.g., 1, 2, 3, etc.) is determined. Alternatively, a value for each energy storage device can be generated based on, for example, how recently or some duration that current has been provided to the energy storage device for charging. This value can take various forms, such as a number of milliseconds, one value (e.g., 1 or True) to indicate that current has recently been provided to the energy storage device for charging and another value (e.g., 0 or False) to indicate that current has not recently been provided to the energy storage device for charging, and so forth.

The energy storage device selection module 216B can use the values indicating which thermal zones the energy storage devices are in various different manners. In one or more embodiments, the energy storage device selection module 216B selects an energy storage device to duty cycle providing current to the energy storage devices in different thermal zones. The temperature of an energy storage device typically increases as current is provided to the energy storage device for charging, so by duty cycling the energy storage devices in different thermal zones the increase in heat as a result of charging the energy storage devices is effectively reduced. For example, if there are three energy storage devices, the energy storage device selection module 216B selects a first of the three energy storage devices for charging for a particular amount of time (e.g., 5 seconds), then selects a second of the three energy storage devices for charging for a particular amount of time (e.g., 5 seconds), then selects a third of the three energy storage devices for charging for a particular amount of time (e.g., 5 seconds), then selects the first of the three energy storage devices for charging for a particular amount of time (e.g., 5 seconds), and so forth.

In one or more embodiments, the energy storage device charge selection system 126B selects an energy storage device that is not in a thermally hot zone for charging. However, situations can arise in which all of the energy storage devices are in thermally hot zones (whether the same or different thermal hot zones). In such situations, the energy storage device charge selection system 126B can select no energy storage devices for charging. Alternatively, the energy storage device charge selection system 126B can select at least a subset (e.g., all) of the energy storage devices for charging, and charge those selected energy storage devices with a reduced current in order to reduce the increase in temperature of the energy storage devices when charging. The current can be reduced in various manners such as providing a smaller amount of current to the energy storage devices than is available to the energy storage device system 128. The energy storage device charge selection system 126B can also select energy storage devices to duty cycle providing current to the energy storage devices, spreading the increase in heat as a result of charging the energy storage devices across the different energy storage devices in the subset.

In one or more embodiments, the dynamic system criteria includes an indication of whether the charge path to each of the energy storage devices 202 passes through a thermally hot (also referred to as thermally active) zone. The charge path refers to the various components that energy passes through when being provided to a particular energy storage device to charge the energy storage device. The dynamic system criteria determination module 212B can obtain indications of temperatures of the different thermal zones in the computing device 102 in various manners, as discussed above. The dynamic system criteria determination module 212B can also obtain an indication of which components, including the various components included in the various charge paths, are in which thermal zones. A value for each energy storage device can be generated based on whether the charge path passes through a thermally hot zone. For example, a value of 1 or True can be used to indicate that the charge path passes through a thermally hot zone, and a value of 0 or False can be used to indicate that the charge path does not pass through a thermally hot zone (which may also be referred to as a thermally stable zone).

The energy storage device selection module 216B can use the values indicating which charge paths pass through a thermally hot zone and which charge paths do not pass through a thermally hot zone in various different manners. In one or more embodiments, the energy storage device selection module 216B selects to charge an energy storage device that receives power via a charge path that does not pass through a thermally hot zone. By selecting to charge an energy storage device that receives power via a charge path that does not pass through a thermally hot zone, the energy storage device charge selection system 126B facilitates managing thermal stability of the computing device 102 (e.g., keeping a thermal zone of the computing device 102 from getting too hot) when selecting which energy storage devices 202 to charge.

In one or more embodiments, the dynamic system criteria (or the static system criteria) includes an indication of which thermal zones the charge paths for each of the energy storage devices 202 pass through. A value for each energy storage device that is the thermal zone(s) the charge path to the energy storage device 202 passes through (e.g., 1, 2, 3, etc.) is determined. Alternatively, a value for each energy storage device can be generated based on, for example, how recently or some duration that the energy storage device has been charged. This value can take various forms, such as a number of milliseconds, one value (e.g., 1 or True) to indicate that the energy storage device has been recently charged and another value (e.g., 0 or False) to indicate that the energy storage device has not been recently charged, and so forth.

The energy storage device selection module 216B can use the values indicating which thermal zones the charge paths pass through in various different manners. In one or more embodiments, the energy storage device selection module 216B selects an energy storage device to duty cycle power through different charge paths that pass through different thermal zones. By duty cycling the charge paths, the energy storage device charge selection system 126B facilitates managing thermal stability of the computing device 102 (e.g., keeping a thermal zone of the computing device 102 from getting too hot) when selecting which energy storage devices 202 to charge.

The prediction module 214B represents functionality operable to determine values for various characteristics of estimated or predicted user behavior (e.g., predicting the intent of the user), program behavior (e.g., predicting how the software installed is using/causing usage of the system, such as an antivirus service), and/or more general usage of the computing device 102. This predicted behavior or usage can include, for example, removal or insertion of hot-swappable batteries that are part of the energy storage device system 128, duration of a connection of the computing device 102 to an AC power source, expected future workload and/or power usage of the computing device 102, and so forth.

In one or more embodiments, the predicted behavior or usage includes removable energy storage device presence predictions. A removable energy storage device refers to an energy storage device that can be disengaged from the energy storage device system 128, such as removed from the housing that includes other components of the computing device 102 (such as the processing system 104). The removable energy storage device can be implemented in various manners, such as a hot-swappable energy storage device (which refers to an energy storage device that can be inserted into and withdrawn from the housing during operation of the computing device 102 while the computing device 102 is not powered off), a cold-swappable battery energy storage device (which refers to an energy storage device that can be inserted into and withdrawn only when the computing device is not functional (e.g., is powered off)), an energy storage device in a removable peripheral device (e.g., an energy storage device in a keyboard coupled to the housing, which can be hot-swappable or cold-swappable), an energy storage device in a case or protective cover of the computing device 102 (which can be hot-swappable or cold-swappable), and so forth.

A value is obtained for each removable energy storage device indicating whether the energy storage device is predicted to be no longer present (e.g., removed) in the near future. For example, a value of 1 or True can be used to indicate that the removable energy storage device is predicted to be removed in the near future, and a value of 0 or False can be used to indicate that the removable energy storage device is not predicted to be removed in the near future. Values can be obtained for all removable energy storage devices, or alternatively only for certain energy storage devices (e.g., hot-swappable energy storage devices). By way of another example, a non-binary value may be used to indicate whether the energy storage device is predicted to be no longer present (e.g., removed) in the near future, such as a probability value (e.g., a percentage ranging from 0% to 100%) of how likely it is that the energy storage device will be removed in the near future.

The energy storage device selection module 216B can use the values representing whether the removable energy storage devices are predicted to be no longer present (e.g., removed) in the near future in various different manners. In one or more embodiments, if a removable energy storage device (e.g., a hot-swappable energy storage device) is predicted to be removed in the near future, then the removable energy storage device selection module 216B selects to charge an energy storage device that is not predicted to be removed in the near future. By charging an energy storage device that is not predicted to be removed in the near future power is not expended charging an energy storage device that is expected to removed (and thus not usable as a power source for the computing device 102) soon anyway.

In one or more embodiments, an energy storage device predicted to be removed in the near future refers to an energy storage device that is predicted to be removed within some threshold value. This threshold value can be, for example, a threshold amount of time of the current time (such as on the order of minutes or hours, such as 10 minutes or 2 hours). This threshold value can also be a threshold amount of energy, such as an absolute energy value or a percent value.

The prediction module 214B can estimate or predict that a removable energy storage device is to be removed in the near future in a variety of different manners. In one or more embodiments, the prediction module 214B maintains a record (e.g., over a matter of weeks or months) indicating times of the day and/or days of the week that the removable energy storage device is present and times of the day and/or days of the week that the removable energy storage device is not present. From this record, the prediction module 214B can identify usage patterns that indicate when the removable energy storage device is not present at the computing device 102 and the durations when the removable energy storage device is not present at the computing device 102. Any of a variety of public and/or proprietary techniques can be used to analyze the record to identify these usage patterns.

For example, if every Monday (or at least a threshold number of Mondays, such as 80%) from 3:00 pm-5:00 pm the removable energy storage device is not present at the computing device 102, then the prediction module 214B can predict that on the following Monday from 3:00 pm-5:00 pm the removable energy storage device will not be present at the computing device 102. By way of another example, if every day of the week (or at least a threshold number of days, such as 75%) from noon-1:00 pm the removable energy storage device is not present at the computing device 102, then the prediction module 214B can predict that, if it is currently 11:00 am, the removable energy storage device will not be present at the computing device 102 from noon-1:00 pm on the current day.

Additionally or alternatively, the prediction module 214B can estimate or predict that a removable energy storage device is to be removed in the near future based on any of a variety of other data. The prediction module 214B can obtain data from various different sources and analyze the data using any of a variety of public and/or proprietary techniques to identify expected future usage patterns.

By way of example, the prediction module 214B can obtain data from a calendar of the user of the computing device 102. The calendar can include appointments or meetings with locations away from the user's office or home, and the prediction module 214B can predict, for example, that a removable energy storage device will not be present at the computing device 102 during those appointments or meetings.

By way of example, the prediction module 214B can obtain data from a cloud service that collects usage data for computing devices. The cloud service can provide an indication of times of the day and/or days of the week when users of computing devices of the same type as computing device 102 have a removable energy storage device not present. The prediction module 214B can predict, for example, that a removable energy storage device will not be present at the computing device 102 during those times of the day and/or days of the week indicated by the cloud service.

Similarly, the estimated or predicted usage of the computing device can include energy storage device use predictions. In addition to not using an energy storage device to power the computing device 102 because the energy storage device has been removed, a determination can be made that an energy storage device will not be used for powering the computing device 102 for various other reasons. Examples of such reasons include age balancing of the energy storage devices, inability to charge the energy storage device up to its optimal charge curve path, and so forth. In one or more embodiments, if an energy storage device is predicted to not be used for powering the computing device 102, then the removable energy storage device selection module 216B selects to charge an energy storage device that is predicted to be used for powering the computing device 102. By charging an energy storage device that is predicted to be used for powering the computing device 102 power is not expended charging an energy storage device that is expected not to be used for powering the computing device 102 anyway.

The prediction module 214B can estimate or predict various timing information regarding when the computing device is to be connected to an AC power source, such as how soon the computing device will be connected to an AC power source and/or for how long (a duration that) the computing device will be connected to the AC power source. Although references are made herein to an AC power source, it should be noted that such references can refer to any external power source such as an AC power source, a wireless power source, and/or an external energy storage device. In one or more embodiments, the predicted behavior or usage includes predicted duration of a connection of the computing device 102 to an AC power source (a charging window). A value is determined indicating a time duration that the computing device 102 is predicted to be connected to an AC power source. For example, a value that is a number of seconds or minutes can be determined to indicate the time duration that the computing device 102 is predicted to be connected to an AC power source. By way of another example, a value can be determined that is an amount of energy predicted to be drawn (e.g., available) from an AC power when the computing device 102 is predicted to be connected to the AC power source.

The energy storage device selection module 216B can use the value indicating the time duration that the computing device 102 is predicted to be connected to an AC power source in various different manners. In one or more embodiments, if the computing device is predicted to be connected to an AC power source for a small amount of time and/or to a weak AC power source (e.g., an AC power source that is not sufficient to charge energy storage devices 202 such that they may supply sufficient or desired energy to the computing device 102), then the energy storage device selection module 216B selects to charge an energy storage device capable of rapid charging (and rapid charges the selected energy storage device). This small amount of time is, for example, less than a threshold amount of time, which can be a fixed amount of time (e.g. 5 minutes) or a percentage (e.g., 25% of an estimated amount of time to fully charge the energy storage devices in the computing device in light of their current charge levels). This small amount of time can also be based on an amount of energy ingested, such as being an amount of time insufficient for the energy storage device to ingest (e.g., be charged with), at a lower (e.g., non-rapid) charge rate, enough energy to power the system for a desired amount of time. In embodiments in which the energy storage devices 202 include different types of energy storage devices, those different types of energy storage devices can support different charge rates. An energy storage device capable of rapid charging refers to an energy storage device that can be charged at rapid rate. This rapid rate can be a threshold rate (e.g., at least 1000 milliamps/hour), or a relative rate based on the other energy storage devices in the computing device (e.g., the rapid rate can be a rate faster than all or at least one other energy storage device in the computing device).

In one or more embodiments, when the computing device 102 is running hot (thermally active) but the prediction module 214B detects a small charging window coming up where a rapid-current can be consumed from the charging source, the computing device 102 will employ thermal conditioning techniques (such as turning on fans or other passive thermal conditioning techniques), in advance of the charging window to prepare one or more energy storage devices 202 to ingest (consume) full rapid-charging current. These conditioning techniques can reduce the temperature of the computing device and reduce overheating of the computing device 102.

Additionally or alternatively, the decision to rapid charge an energy storage device may be made purely based on the amount of energy predicted to be used by the computing device 102, the amount of energy available in the energy storage device 202, and the amount of power predicted to be available for consumption from the AC power source, as described above.

In one or more embodiments, if the computing device is predicted to be connected to an AC power source for a small amount of time, then the energy storage device selection module 216B selects to charge an energy storage device capable of rapid charging regardless of whether that energy storage device is in a thermally hot zone. Alternatively, if the computing device is predicted to be connected to an AC power source for a small amount of time and if all of the energy storage devices capable of rapid charging are in thermally hot zones, then the energy storage device selection module 216B provides an indication to the operating system 108 to throttle (e.g., reduce) the software and/or hardware performance levels until a sufficient amount of energy is ingested by the energy storage devices 202 to power the predicted energy requirement of the system, and commence rapid charging (e.g., ingesting full charging current) of one or more energy storage devices 202.

The prediction module 214B can estimate or predict the time duration of the computing device being connected to an AC power source in a variety of different manners. In one or more embodiments, the prediction module 214B maintains a record (e.g., over a matter of weeks or months) indicating times of the day and/or days of the week that the computing device is connected to an AC power source. From this record, the prediction module 214B can identify usage patterns that indicate when the computing device is connected to an AC power source and the durations when the computing device is connected to an AC power source. Any of a variety of public and/or proprietary techniques can be used to analyze the record to identify these usage patterns.

For example, if every Sunday (or at least a threshold number of Sundays, such as 80%) from noon to midnight the computing device is connected to an AC power source, then the prediction module 214B can predict that on the following Sunday at noon the computing device will be connected to an AC power source for 12 hours. By way of another example, if every day of the week (or at least a threshold number of days, such as 75%) from midnight to 6:00 am the computing device is connected to an AC power source, then the prediction module 214B can predict that, at midnight, the computing device will be connected to an AC power source for 6 hours.

Additionally or alternatively, the prediction module 214B can estimate or predict the time duration that the computing device will be connected to an AC power source based on any of a variety of other data. The prediction module 214B can obtain data from various different sources and analyze the data using any of a variety of public and/or proprietary techniques to identify expected future usage patterns.

By way of example, the prediction module 214B can obtain data from a calendar of the user of the computing device 102. The past usage data (the record indicating times of the day and/or days of the week that the computing device connected to an AC power source) can be compared to the user's calendar and a determination made that during meetings (or meetings at particular locations) the computing device is connected to an AC power source. The prediction module 214B can predict, for example, that the computing device will be connected to an AC power source for the duration of upcoming meetings (or meetings at particular locations) identified in the user's calendar.

By way of another example, the prediction module 214B can obtain location data for the computing device 102, such as from a location awareness module of the computing device 102 (e.g., using a global positioning system (GPS), Bluetooth, Wi-Fi, triangulation, etc.). The past usage data (the record indicating times of the day and/or days of the week that the computing device connected to an AC power source) can be compared to the user's locations and a determination made that at certain locations (e.g., home) the computing device is connected to an AC power source. The prediction module 214B can predict, for example, that the computing device will be connected to an AC power source for more than a small amount of time if the user is at home, but that the computing device will be connected to an AC power source for a small amount of time if the user is not at home and heading towards work (based on calendar entries, meeting appointments, etc.).

By way of example, the prediction module 214B can obtain data from a cloud service that collects usage data for computing devices. The cloud service can provide an indication of, for various times of the day and/or days of the week, the duration that users of computing devices of the same type as computing device 102 have their computing devices connected to an AC power source. The prediction module 214B can predict, for example, that the computing device 102 will be connected to an AC power source for those durations at those times of the day and/or days of the week indicated by the cloud service.

In one or more embodiments, the predicted behavior or usage includes expected future workload and/or power usage of the computing device 102. The expected future workload and/or power usage of the computing device 102 is determined, and a determination is made as to whether there is sufficient charge in the energy storage devices to perform the expected future workload and/or power usage of the computing device 102. A value is determined indicating whether there is sufficient charge in the energy storage devices to perform the expected future workload and/or power usage of the computing device 102. The expected future workload and/or power usage of the computing device 102 can be used, for example. as a factor in determining whether the charge in the energy storage devices is sufficient for some amount of time.

The energy storage device selection module 216B can use the values representing whether there is sufficient charge in the energy storage devices to perform the expected future workload and/or power usage of the computing device 102 in various different manners. In one or more embodiments, if there is sufficient charge in the energy storage devices to perform the expected future workload and/or power usage of the computing device 102, then the energy storage device selection module 216B selects to charge the energy storage devices in a balanced manner. This balanced manner can include, for example, duty cycling providing power to the energy storage devices.

The energy storage device selection module 216B optionally determines to provide power to the energy storage devices in a balanced manner in response to there being sufficient charge in each of the energy storage devices to perform the expected future workload and/or power usage of the computing device 102. If one or more of the energy storage devices do not have sufficient charge to perform the expected future workload and/or power usage of the computing device 102 then various other actions can be taken, such as providing more power from the energy storage device having a lower charge than the other energy storage device, providing power to the energy storage devices based on the predicted availability of the energy storage devices, and so forth.

The prediction module 214B can estimate or predict the expected future workload and/or power usage of the computing device 102 in a variety of different manners. The prediction module 214B estimates or predicts the expected future workload and/or power usage of the computing device 102 as an aggregate function of location, user activity, and derived intent. In one or more embodiments, the prediction module 214B maintains a record (e.g., over a matter of weeks or months) indicating times of the day and/or days of the week and the power usage during those times and/or days. From this record, the prediction module 214B can identify usage patterns that indicate power usage of the computing device 102. Any of a variety of public and/or proprietary techniques can be used to analyze the record to identify usage patterns based on time and/or day. Additionally or alternatively, the prediction module 214B maintains a record of applications run on the computing device 102 and the power usage while those applications are run. From this record, the prediction module 214B can identify usage patterns that indicate power usage of the computing device 102 based on application(s) running. Any of a variety of public and/or proprietary techniques can be used to analyze the record to identify usage patterns.

For example, if every Monday (or at least a threshold number of Mondays, such as 80%) from 7:00 am to 10:00 am a particular amount of power (e.g., 1500 milliamp hours (mAh)) is used, then the prediction module 214B can predict that on the following Monday from 7:00 am to 10:00 am the computing device will use that same particular amount of power (e.g., 1500 mAh). By way of another example, if every day of the week (or at least a threshold number of days, such as 75%) from noon to 1:00 pm the computing device uses a particular amount of power (e.g., 30 mAh), then the prediction module 214B can predict that, if it is currently 11:00 am, the computing device will use 30 mAh from noon to 1:00 pm today. By way of yet another example, if every time (or at least a threshold number of times, such as 70%) an image processing application is run on the computing device the computing device uses 1000 milliamps per hour (mA/h), then the prediction module 214B can predict that, if that image processing is currently running on the computing device then the computing device will currently use 1000 mA/h.

Additionally or alternatively, the prediction module 214B can estimate or predict the expected future workload and/or power usage of the computing device 102 based on any of a variety of other data. The prediction module 214B can obtain data from various different sources and analyze the data using any of a variety of public and/or proprietary techniques to identify expected future usage patterns.

By way of example, the prediction module 214B can obtain data from a calendar of the user of the computing device 102. The past usage data (the record indicating times of the day and/or days of the week and the power usage during those times and/or days) can be compared to the user's calendar and a determination made that during meetings (or meetings at particular locations) the computing device uses a particular amount of power (e.g., 50 mA/h). The prediction module 214B can predict, for example, that the computing device will also use 50 mA/h during upcoming meetings (or meetings at particular locations) identified in the user's calendar, or more than 50 mA/h (e.g., 70 mA/h) if the user is marked as meeting presenter.

By way of example, the prediction module 214B can obtain data from a calendar and/or digital personal assistant (e.g., the Cortana® personal assistant) of the user of the computing device 102. The prediction module 214B can predict, given this obtained data, when the user will be away from the computing device 102 (e.g., for a meeting, for coffee, etc.). The prediction module 214B can further predict, for example, that the computing device will use a small amount of power (e.g., 5 mA/h) while the user is away from the computing device 102.

By way of example, the prediction module 214B can obtain location data for the computing device 102, such as from a location awareness module of the computing device 102. The past usage data (the record indicating times of the day and/or days of the week and the power usage during those times and/or days) can be compared to the user's locations and a determination made that at certain locations (e.g., home) the computing device uses a particular amount of power (e.g., 100 mA/h). The prediction module 214B can predict, for example, that the computing device will also use 100 mA/h when the user is next at home.

By way of example, the prediction module 214B can obtain data from a cloud service that collects usage data for computing devices. The cloud service can provide an indication of times of the day and/or days of the week and the power usage during those times and/or days for other computing devices of the same type as computing device 102. The prediction module 214B can predict, for example, that the computing device will use similar or the same amount of power during those times of the day and/or days of the week indicated by the cloud service.

Given the information from static criteria determination module 210B, the dynamic system criteria determination module 212B, and/or the prediction module 214B, the energy storage device selection module 216B can readily select which energy storage devices 202 to charge at any particular time. The determination of which energy storage device(s) 202 to charge can be made at various times, such as at regular or irregular intervals (e.g., some time duration), in response to certain events (e.g., a temperature in thermal zone satisfying a threshold value, such as 80% of a maximum temperature desired by a designer or supplier of the computing device 102), and so forth.

In one or more embodiments, the energy storage device selection module 216B uses the individual criteria as discussed above. The energy storage device selection module 216B can use individual criteria or alternatively any combination of criteria. Additionally or alternatively, the energy storage device selection module 216B can apply various different rules or algorithms to determine which energy storage device(s) 202 to charge at any given time.

In one or more embodiments, the energy storage device selection module 216B attempts to satisfy all the criteria used by the energy storage device charge selection system 126B. Although various criteria are discussed herein, it should be noted that not all of the criteria discussed herein need by used by the energy storage device charge selection system 126B. Additionally or alternatively, additional criteria can also be used by the energy storage device charge selection system 126B.

If all of the criteria used by the energy storage device charge selection system 126B can be satisfied, then the energy storage device selection module 216B selects which energy storage device(s) to charge at any given time so that all the criteria used by the energy storage device charge selection system 126B are satisfied. However, situations can arise where all of the criteria cannot be satisfied. For example, a removable energy storage device 202 may be predicted to be no longer present in the near future but is the only energy storage device that is not in a thermally hot zone, so one criteria may indicate to charge that energy storage device but another criteria indicates not to charge that energy storage device.

In one or more embodiments, each criteria is assigned a different classification. Various different classification levels with various different labels can be used, and these classification levels can be assigned statically and/or dynamically. Any of a variety of different classification names or labels can be used. One example of classification levels is (in order of priority or importance) critical, important, and informational. Other classification levels or labels can alternatively be used, such as a number or an "importance" value (e.g., 0 through 100). Higher classification levels are given priority over lower classification levels. For example, assume that a removable energy storage device being predicted to be no longer present in the near future is given a classification level of important, and the energy storage device being in a thermally stable zone is given a classification level of critical (which is higher than important). If the removable energy storage device 202 that is predicted to be no longer present in the near future is the only energy storage device in a thermally stable zone, then the energy storage device selection module 216B selects to charge that energy storage device 202 rather than other energy storage devices because selecting an energy storage device in a thermally stable zone is given priority over selecting the energy storage device that is predicted to not be present in the near future. However, it should be noted that this selection may be overturned. For example, the energy storage device charge selection system 126B may choose to continue with rapid charging even though the computing device 102 is running hot and indicate to the operating system 108 that the operating system 108 should throttle the software and/or hardware performance levels. This decision is made dynamically based on current computing device state, user intent, and predicted energy requirements of the computing device and state of charge. This dynamic nature of the of the energy storage device charge selection system 126B provides better energy storage device charging management than is provided by static policies alone.

In one or more embodiments, situations can also arise in which criteria at the same classification level conflict with one another. Such situations can be resolved in various manners, such as by using priority levels assigned to the different criteria. These priority levels can be assigned statically and/or dynamically. Any of a variety of different priority names or labels can be used. One example of labels is (in order of priority or importance) high, medium, and low. If two different criteria having the same classification level conflict (e.g., one criteria indicates that a particular energy storage device should be used and another indicates that particular energy storage device should not be used), then the energy storage device selection module 216B applies the criteria having the higher priority. However, if two different criteria having the same priority level but different classification levels conflict, then the energy storage device selection module 216B applies the criteria having the higher classification level.

The evaluation of classifications levels and priority levels can alternatively be performed in the reverse order. For example, if two different criteria conflict (e.g., one criteria indicates that a particular energy storage device should be charged and another indicates that particular energy storage device should not be charged), then the energy storage device selection module 216B applies the criteria having the higher priority. Situations can arise in which criteria at the same priority level conflict with one another. Such situations can be resolved in various manners, such as by using classification levels assigned to the different criteria. E.g., if two different criteria having the same priority level conflict (e.g., one criteria indicates that a particular energy storage device should be charged and another indicates that particular energy storage device should not be charged), then the energy storage device selection module 216B applies the criteria having the higher classification level.

In one or more embodiments, the energy storage device selection module 216B applies battery age balancing in selecting energy storage devices. The battery age balancing can be considered an additional criteria. Battery age balancing refers to the act of charging two or more energy storage devices such that they are charged proportionally according to their size, chemistry, and designed cycle count. In other words, the act of age balancing intends to charge the least degraded batteries as much as possible. Many energy storage devices degrade (e.g., lose capacity) as the number of charge/discharge cycles they've undergone increases. By performing battery age balancing, energy storage device degradation is reduced in the computing device 102 (e.g., the energy storage devices degrade at approximately the same rate).

The energy storage device selection module 216B can prepare the computing device for effective battery age balancing in various different situations. For example, in situations in which removable (e.g., hot-swappable) energy storage devices in the computing device (e.g., one or more removable energy storage devices in the computing device or one or more hot-swappable removable energy storage devices) are predicted to be present in the near future and aggregate energy present in all energy storage devices 202 is sufficient to power the computing device, then the energy storage device selection module 216B selects the energy storage devices 202 that are degraded the least. Additionally, in circumstances where non-swappable or cold-swappable energy storage devices have aged un-uniformly, the energy storage device selection module 216B will aid battery age balancing for these devices as well. This age balancing assistance can be performed, for example, whenever the energy storage device selection module 1268 identifies that the charge available in the energy storage devices is sufficient to power the computing device 102 (e.g., up-time of the computing device will not be compromised due to lack of available charge in the energy storage devices).

It should also be noted that although discussions are made herein to selecting which energy storage device to charge, the selection can additionally or alternatively be a selection of what ratio to provide power to multiple different energy storage devices. For example, using the criteria discussed herein the energy storage device selection module 216B can select two energy storage devices (e.g., two energy storage devices in the same thermal zone) and provide power to both (e.g., 50% of the available charging power to both, more power (e.g., 75% of the available charging power) to one energy storage device and the remaining power (e.g., 25% of the available charging power) to the other energy storage device), and so forth.

The techniques discussed herein provide a dynamic approach to selecting which of multiple energy storage devices to charge. This dynamic approach various based on multiple different criteria, and can factor in the way in which a user uses his or her computing device. Thus, rather than having a one-size-fits-all approach to selecting an energy storage device to charge, the dynamic approach discussed herein is customized or tailored to the individual user. This results in reducing the energy loss in energy storage devices during operation of the computing device, approximately uniform aging of energy storage devices, improved thermal stability of the computing device, and extended usability of the computing device.

Generally speaking, an energy storage device system 128 having multiple energy storage devices may be configured in various ways and employ a variety of different types of energy storage devices. In one or more implementations, different energy storage devices 202 included with a system have different characteristics, such as differences in one or more of battery chemistry, capacity, voltage, size, shapes and/or state of charge (SOC), to name a few examples. Using different types of energy storage devices provides flexibility for design of the energy storage device system and circuit boards, and consequently enables device developers to make better utilization of internal space to provide devices having increased battery life and efficiency. The different energy storage devices are arranged in a circuit that enables selective switching among the energy storage devices.

Figure 3B:
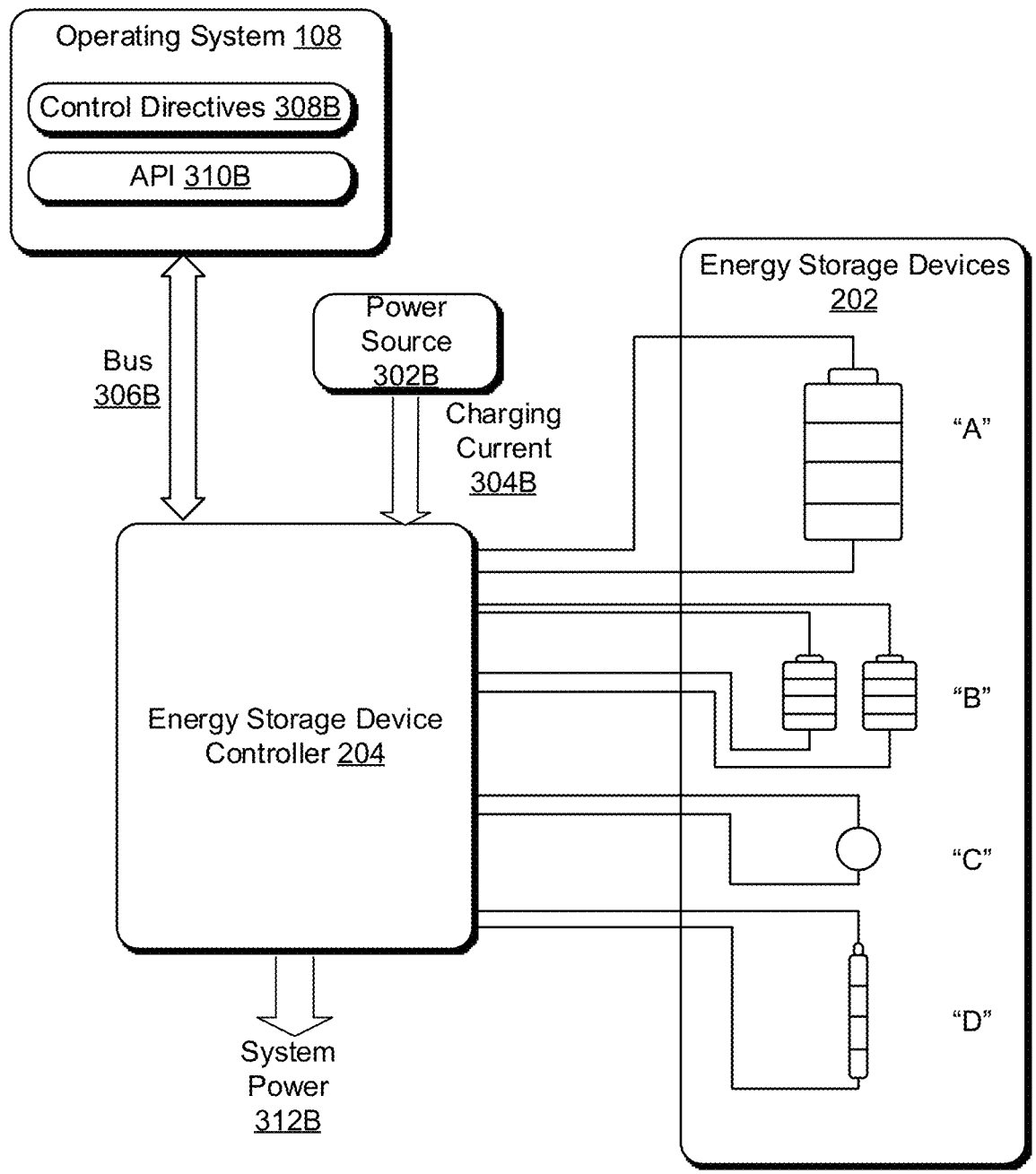
FIG. 3B depicts an example charging architecture for an energy storage device system having multiple energy storage devices.

In particular, FIG. 3B depicts a charging architecture for an energy storage device system having multiple energy storage devices 202. The energy storage devices 202 may be connected in a circuit that includes an energy storage device controller 204 as described in relation to the example of FIG. 3A. In the depicted example, energy storage devices 202 include different representative energy storage devices labeled "A", "B", "C", and "D". Each of the energy storage devices is connected directly to the charge energy storage device 204 in a manner that provides individual current paths to and from each of the energy storage devices for charging and/or discharge. The depicted energy storage devices 202 are also represented as a collection of heterogeneous energy storage devices, although the energy storage devices 202 can alternatively be the same types of energy storage devices.

The energy storage device controller 204 is depicted as being connected to a power source 302 from which charging current 304 may be obtained to charge the energy storage devices 202. To perform the charging, the energy storage device controller 204 may implement a charging strategy that selects different energy storage devices for charging at different times at determined by the energy storage device selection module 216B as previously discussed. When power is supplied via the power source 302B, switching hardware 206 of the energy storage device controller 204 can direct the current to energy storage devices using the individual current paths (e.g., on a per-energy storage device basis).

As further represented in FIG. 3B, the energy storage device controller 204 may be configured to coordinate charging activity with an operating system 108 via communications exchanged via a bus 306B (e.g., an I2C bus or other suitable communication bus) or other suitable communication channel. In particular, the operating system 108 may include an energy storage device selection module 216B or comparable functionally that is operable to direct operation of the energy storage device controller 204 as discussed herein. In order to do so, the operating system 108 may communicate control directives 308B to the energy storage device controller 204 that provides indications regarding which energy storage devices 202 to charge at which times. The control directives 308B are configured to dynamically program the energy storage device controller 204 to charge the desired energy storage devices 202 at the desired times as indicated by the energy storage device selection module 216B.

Control directives 308B may be configured as any suitable messages, signals, or communications that are effective to convey information regarding policy decisions and selected strategies to set-up the energy storage device controller 204 accordingly. By way of an example and not limitation, the operating system may expose an application programming interface (API) 310B that may be used by the energy storage device selection module 216B and/or other applications to interact with and configured the charge controller 204. In one approach, the API 310B may be invoked to communicate control directives 308B that are configured to set registers of the energy storage device controller 204. In any event, the control directives 308B provide a mechanism to access and manipulate charging functionality provided via the energy storage device controller 204 to implement different strategies and tailor charging to different scenarios.

It should be noted that although various different values, labels, levels, and so forth are discussed herein, these are examples and the techniques discussed herein are not limited to these examples. For example, any specific threshold values and/or labels discussed herein are only examples, and various other threshold values and/or labels can additionally or alternatively be used. These examples are illustrations only and are not intended to limit the scope of the techniques discussed herein.

Figure 3C:
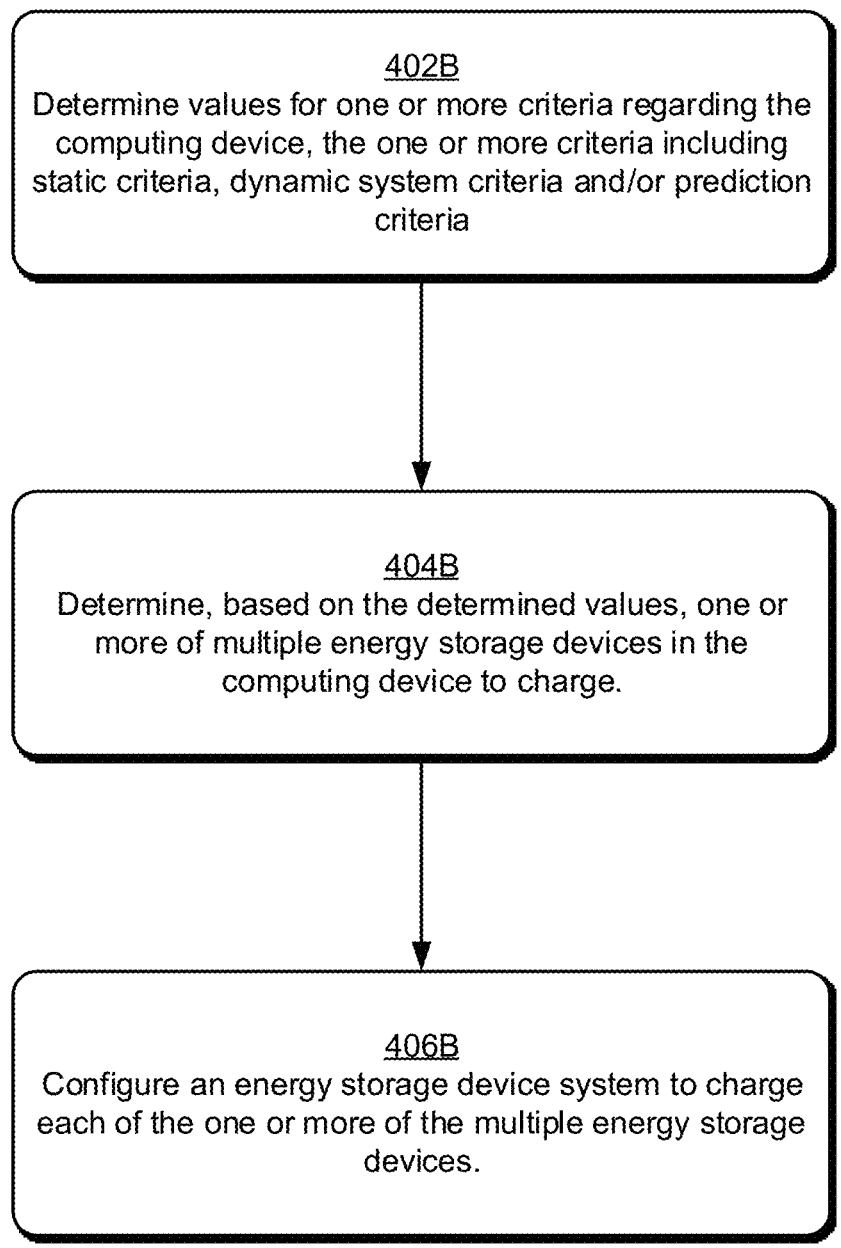
FIG. 3C is a flow diagram of an example procedure for dynamic energy storage device charging.

Further aspects of the dynamic energy storage device charging techniques are discussed in relation to example procedure of FIG. 3C. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks.

FIG. 3C is a flow diagram that describes details of an example procedure for dynamic energy storage device charging in accordance with one or more implementations. The procedure 400 describes details of charging multiple energy storage devices. The procedure can be implemented by way of a suitably configured computing device, such as by way of an operating system 108, energy storage device charge selection system 126B, and/or other functionality described in relation to the examples above.

Values for one or more criteria regarding the computing device are determined (block 402B). The one or more criteria can be static criteria, dynamic system criteria, and/or prediction criteria. By way of example, the values can be the temperatures of each of multiple thermal zones in a computing device, whether a removable energy storage device is predicted to be no longer present (e.g., removed) in the near future, and so forth.

One or more of multiple energy storage devices in the computing device to charge are determined based on the determined values (block 404B). Power can be provided to a single energy storage device, or alternatively to multiple energy storage devices.

An energy storage device system is configured to charge each of the one or more energy storage devices (block 406B). Power is provided to the one or more energy storage devices to charge the one or more energy storage devices.

Energy Storage Device Discharge Selection System

Dynamic energy storage device discharging is described for a computing device having an energy storage device system with multiple energy storage devices. These multiple energy storage devices can be the same types of energy storage devices or alternatively different types of energy storage devices having various different characteristics such as different sizes, capacities, technologies, chemistries, shapes, age, cycles, temperature, and so forth. Various different criteria are used to determine which one or more of the multiple energy storage devices to discharge at any given time to provide power to the computing device.

The criteria used to determine which one or more of the multiple energy storage devices to discharge at any given time to provide power to the computing device include static criteria, dynamic system criteria, and prediction criteria. The static criteria refers to characteristics of the energy storage devices as well as hardware and/or physical characteristics of the computing device that do not change while the computing device operates (e.g., while executing different programs). The dynamic system criteria refers to characteristics of the energy storage devices and/or the computing device that changes while the computing device operates (e.g., while executing different programs). The prediction criteria refers to estimated or predicted user behavior (e.g., predicting the intent of the user), program behavior (e.g., predicting how the software installed is using/causing usage of the system, such as an antivirus service), and/or more general usage of the computing device, such as removal or insertion of hot-swappable batteries, connection to an AC power source, workload and/or power usage of the computing device, and so forth.

These criteria are evaluated during operation of the computing device, and the appropriate energy storage device(s)

from which to draw power at any given time based on these criteria are determined. The techniques discussed herein allow power to be drawn from the multiple energy storage devices for the computing device in a manner that accommodates the particular computing device as well as the user's typical use of the computing device. Smarter decisions can be made regarding which energy storage device to draw power from, which can allow the computing device to be run on energy storage device power for a longer duration of time and can extend the lifespan of the energy storage devices.

Figure 4A:
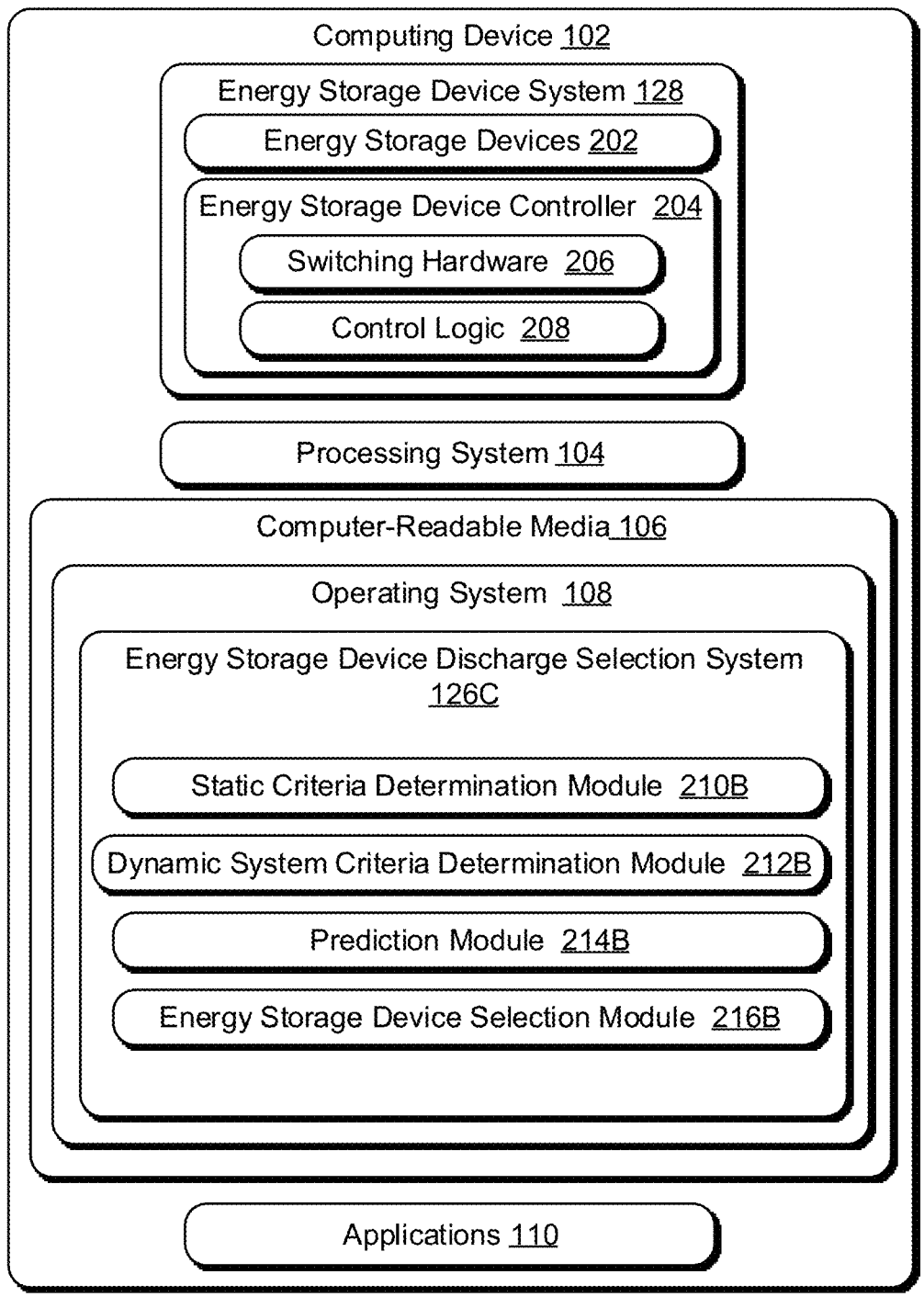
FIG. 4A depicts an energy storage device system with multiple energy storage devices.

FIG. 4A depicts details of a computing device 102 having an energy storage device system 128 with multiple energy storage devices in accordance with one or more implementations. Computing device 102 also includes processing system 104, computer readable media 106, operating system 108 and applications 110 as discussed in relation to FIG. 1. In the depicted example, an energy storage device discharge selection system 126C is also shown as being implemented as a component of the operating system 108. It should be noted, however, that the energy storage device discharge selection system 126C can alternatively be implemented in other manners. For example, parts of (or all of) the energy storage device discharge selection system 126C can be implemented as part of the energy storage device system 128.

The energy storage device system 128 and its components are described above. However, functionality provided by the dynamic external power resource selection system 126A (or the energy storage device charge selection system 126B) may instead be provided by the energy storage device discharge selection system 126C. Furthermore, the energy storage device controller 204 may or may not control delivery of power to the energy storage devices 202 to charge the energy storage devices 202. And, control logic 208 Control logic 208 may reflect different switching modes that switch between drawing power from different ones of the energy storage devices 202 so that power is drawn from one of the energy storage devices 202 based on various criteria as determined by the energy storage device discharge selection system 126C, for example.

The energy storage device discharge selection system 126C includes a static criteria determination module 210B, a dynamic system criteria determination module 212B, a prediction module 214B, and an energy storage device selection module 216B.

The static criteria determination module 210B functions as described above.

In one or more embodiments, the static criteria includes an energy storage device charge level. For many energy storage devices, the efficiency of the energy storage device degrades as the energy storage device is discharged. Thus, an energy storage device when fully charged can be more efficient at providing power than when the energy storage device has only a 25% charge. A threshold charge level is set, and whether the energy storage device has satisfied the threshold charge level (e.g., has a charge level at and/or greater than the threshold charge level) is determined. A value for the energy storage device charge level criteria is generated based on whether the energy storage device has satisfied the threshold charge level. For example, a value of 1 or True can be used to indicate that the energy storage device has satisfied the threshold charge level, and a value of 0 or False can be used to indicate that the energy storage device has not satisfied the threshold charge level.

The threshold charge level can be set in a variety of different manners, such as based on an energy storage device discharge curve. The energy storage device discharge curve is a plot of remaining charge versus time for the energy storage device as the energy storage device discharges. The discharge curve drops faster (has a more negative slope) at later times in the plot than at earlier times. That is, the discharge curve drops faster the lower the remaining charge is in the energy storage device. Different energy storage devices can have different discharge curves. The threshold charge level can be set based on the discharge curve, such as when the discharge curve starts to drop at a particular rate (e.g., starts to drop at a rate that is 10% faster than the lowest rate, has a slope of −0.2, etc.). The discharge curve can be obtained in a variety of different manners, such as from the supplier or manufacturer of the energy storage device, based on observations of discharging the energy storage device by the computing device 102 (e.g., by the operating system 108 and/or energy storage device discharge selection system 126C), and so forth.

The energy storage device selection module 216B can use the threshold charge level in various different manners. In one or more embodiments, the energy storage device selection module 216B selects for a component an energy storage device to power that component that satisfies the threshold charge level for that energy storage device.

In one or more embodiments, the static criteria includes an indication of proximity of components in the computing device 102 that consume power and the energy storage device 202. The indication of proximity of components can be for all components in the computing device 102, or alternatively only select components. For example, these select components can be components that typically consume most (e.g., at least a threshold amount, such as 20%) of the power in the computing device 102, such as processing units (e.g., graphics processing unit, central processing unit), display devices, and so forth. The proximity of a component to an energy storage device refers to the electrical proximity between the components. The proximity of a component to an energy storage device can be specified using various differing values. In one or more embodiments, the proximity of a component to an energy storage device is specified by a value that represents the interconnect resistance between the component and the energy storage device. The interconnect resistance is a measure of the amount of resistance between a component and an energy storage device, and typically increases as the physical distance between the component and the energy storage device increases. Larger amounts or interconnect resistance result in larger amounts of power loss between the component and the energy storage device. Additionally or alternatively, the proximity of a component to an energy storage device is specified by a value that is the physical distance from the component to the energy storage device (e.g., as measured in centimeters or inches).

A different value representing the proximity of a component to an energy storage device is obtained for each component and energy storage device pair. The values representing the proximity of a component to an energy storage device can be obtained in a variety of different manners, such as from the supplier or manufacturer of the computing device 102, based on observations of discharging the energy storage device by the computing device 102 (e.g., by the operating system 108 and/or energy storage device discharge selection system 126C), and so forth.

The energy storage device selection module 216B can use the values representing the proximity of components to energy storage devices in various different manners. In one or more embodiments, the energy storage device selection module 216B selects for a component an energy storage device to power that component that is most energy efficient for that component. For example, for a given processing unit, the energy storage device selection module 216B can select as the most efficient energy storage device for the processing unit the energy storage device having the smallest interconnect resistance to the processing unit, and/or the energy storage device having the smallest physical distance to the processing unit.

The dynamic system criteria determination module 212B functions as described above. Note that the criteria used by the dynamic system criteria determination module 212 can include the temperature of a thermal zone of the computing device 102, which changes over time during operation of the computing device 102 as opposed to the proximity of a component to an energy storage device which typically does not change over time during operation of the computing device 102, the ages of the energy storage devices 202, and so forth.

In one or more embodiments, the dynamic system criteria involve different thermal zones in the computing device 102. A thermal zone refers to a group of one or more components (e.g., hardware) in the computing device 102 that are treated collectively for purposes of temperature control. Different thermal zones can have different cooling mechanisms, such as vents, fans, heat sinks, and so forth. The energy storage device discharge selection system 126C can obtain an indication of which components of the computing device 102 are in which thermal zones in various manners, such as from the supplier or manufacturer of the computing device 102. In one or more embodiments in which the computing device 102 supports the ACPI Specification, such as the ACPI Specification, Version 6.1 (January, 2016), the energy storage device discharge selection system 126C can obtain an indication of the thermal zones in the computing device 102, and optionally which components of the computing device 102 are in which thermal zones, by invoking methods of the ACPI.

In one or more embodiments, the dynamic system criteria includes an indication of whether each of the energy storage devices 202 is in a thermally hot (also referred to as thermally active) zone. The dynamic system criteria determination module 212B can obtain indications of temperatures of the different thermal zones in the computing device 102 in various manners, such as via the ACPI, by accessing temperature gauge components in the computing device 102, and so forth. A thermal zone is referred to as a hot zone or a thermally hot zone if the temperature of the thermal zone satisfies (e.g., is the same as, is the same as or equal to) a threshold temperature. In one or more embodiments, the threshold temperature is a value above which the designer or supplier of the computing device 102 prefers that the thermal zone not run. The threshold temperature can be, for example, a particular temperature (e.g., 85 degrees Fahrenheit), or a relative value (e.g., 80% of a maximum operating temperature of the computing device 102 as specified by the designer or supplier of the computing device 102).

The dynamic system criteria determination module 212B can also obtain an indication of which components, including which energy storage devices 202, are in which thermal zones. A value for each energy storage device can be generated based on whether the energy storage device is in a thermally hot zone. For example, a value of 1 or True can be used to indicate that the energy storage device is in a thermally hot zone, and a value of 0 or False can be used to indicate that the energy storage device is not in a thermally hot zone (which may also be referred to as a thermally stable zone).

The energy storage device selection module 216B can use the values indicating which energy storage devices are in a thermally hot zone and which energy storage devices are not in a thermally hot zone in various different manners. In one or more embodiments, the energy storage device selection module 216B selects an energy storage device that is not in a thermally hot zone to power the computing device 102. The temperature of an energy storage device typically increases as power is drawn from the energy storage device, and by selecting an energy storage device that is not in a thermally hot zone the energy storage device discharge selection system 126C facilitates managing thermal stability of the computing device 102 (e.g., keeping a thermal zone of the computing device 102 from getting too hot) when selecting which energy storage devices 202 to use to power the computing device 102.

In one or more embodiments, the dynamic system criteria includes an indication of which thermal zones the energy storage devices 202 are in. A value for each energy storage device that is the thermal zone the energy storage device 202 is in (e.g., 1, 2, 3, etc.) is determined. Alternatively, a value for each energy storage device can be generated based on, for example, how recently or some duration that the energy storage device has been used to power the computing device 102. This value can take various forms, such as a number of milliseconds, one value (e.g., 1 or True) to indicate that the energy storage device has been recently used to power the computing device 102 and another value (e.g., 0 or False) to indicate that the energy storage device has not been recently used to power the computing device 102, and so forth.

The energy storage device selection module 216B can use the values indicating which thermal zones the energy storage devices are in various different manners. In one or more embodiments, the energy storage device selection module 216B selects an energy storage device to duty cycle power from the energy storage devices in different thermal zones. The temperature of an energy storage device typically increases as power is drawn from the energy storage device, so by duty cycling the energy storage devices in different thermal zones the increase in heat as a result of drawing power from the energy storage devices is effectively reduced.

In one or more embodiments, the dynamic system criteria includes an indication of whether the energy delivery path from each of the energy storage devices 202 passes through a thermally hot (also referred to as thermally active) zone. The energy delivery path refers to the various components that energy passes through when being provided by particular energy storage device to power a particular component. The dynamic system criteria determination module 212B can obtain indications of temperatures of the different thermal zones in the computing device 102 in various manners, as discussed above. The dynamic system criteria determination module 212B can also obtain an indication of which components, including the various components included in the various energy delivery paths, are in which thermal zones. A value for each energy storage device can be generated based on whether the energy delivery path passes through a thermally hot zone. For example, a value of 1 or True can be used to indicate that the energy delivery path passes through a thermally hot zone, and a value of 0 or False can be used to indicate that the energy delivery path does not pass through a thermally hot zone (which may also be referred to as a thermally stable zone).

The energy storage device selection module 216B can use the values indicating which energy delivery paths pass through a thermally hot zone and which energy delivery paths do not pass through a thermally hot zone in various different manners. In one or more embodiments, the energy storage device selection module 216B selects an energy storage device that provides power via an energy delivery path that does not pass through a thermally hot zone to power the computing device 102. By selecting an energy storage device that provides power via an energy delivery path that does not pass through a thermally hot zone, the energy storage device discharge selection system 126C facilitates managing thermal stability of the computing device 102 (e.g., keeping a thermal zone of the computing device 102 from getting too hot) when selecting which energy storage devices 202 to use to power the computing device 102.

In one or more embodiments, the dynamic system criteria includes an indication of which thermal zones the energy delivery paths from each of the energy storage devices 202 pass through. A value for each energy storage device that is the thermal zone(s) the energy delivery path from the energy storage device 202 passes through (e.g., 1, 2, 3, etc.) is determined. Alternatively, a value for each energy storage device can be generated based on, for example, how recently or some duration that the energy storage device has been used to power the computing device 102. This value can take various forms, such as a number of milliseconds, one value (e.g., 1 or True) to indicate that the energy storage device has been recently used to power the computing device 102 and another value (e.g., 0 or False) to indicate that the energy storage device has not been recently used to power the computing device 102, and so forth.

The energy storage device selection module 216B can use the values indicating which thermal zones the energy delivery paths pass through in various different manners. In one or more embodiments, the energy storage device selection module 216B selects an energy storage device to duty cycle power through different energy delivery paths that pass through different thermal zones. By duty cycling the energy delivery paths, the energy storage device discharge selection system 126C facilitates managing thermal stability of the computing device 102 (e.g., keeping a thermal zone of the computing device 102 from getting too hot) when selecting which energy storage devices 202 to use to power the computing device 102.

In one or more embodiments, the dynamic system criteria includes an indication of whether the computing device 102 is under a high power load. The computing device 102 is referred to as being under a high power load if the power drawn from the energy storage devices 202 satisfies (e.g., is the same as, is the same as or equal to) a threshold amount of power. The threshold amount of power can be, for example, a fixed amount of power (e.g., 50 watts), or a relative value (e.g., 80% of a maximum amount of power that the energy storage devices 202 can provide to the computing device 102 as specified by the designer or supplier of the energy storage devices 202 or the computing device 102).

A single value can be generated for the computing device 102 and/or individual values can be generated for the individual energy storage devices. An individual energy storage device can be referred to as being under a high power load if the power drawn from the energy storage device satisfies (e.g., is the same as, is the same as or equal to) a threshold amount of power. The threshold amount of power can be, for example, a fixed amount of power (e.g., 50 watts), or a relative value (e.g., 80% of a maximum amount of power that the energy storage device can provide to the computing device 102 as specified by the designer or supplier of the energy storage device).

A value for the computing device 102 can be generated based on whether the computing device 102 is under a high power load. For example, a value of 1 or True can be used to indicate that the computing device 102 is under a high power load, and a value of 0 or False can be used to indicate that the computing device 102 is not under a high power load (which may also be referred to as a low power load). A value for each individual energy storage device 202 can also be generated based on whether the computing device 102 is under a high power load. The value be a binary value, such as a value of 1 or True to indicate that the energy storage device is under a high power load, and a value of 0 or False to indicate that the energy storage device is not under a high power load. The value can also be a non-binary value, such as a value indicating the current load of the energy storage device relative to the maximum amount of power that the energy storage device can provide (e.g., a percentage of the maximum amount of power that the energy storage device is capable of providing), a value indicating the current load of the energy storage device relative to the load of another energy storage device (e.g., a value indicating the energy storage device is providing the same amount of power, more power, or less power than another energy storage device(s)), and so forth.

The energy storage device selection module 216B can use the value indicating whether the computing device 102 is under a high power load in various different manners. In one or more embodiments, the energy storage device selection module 216B selects two or more energy storage devices in situations in which the computing device 102 is under a high power load. Drawing power from multiple energy storage devices in situation in which the computing device 102 is under a high power load helps counteract Peukert's law. Peukert's law indicates that as the amount of current drawn from an energy storage device increases, the available energy that the energy storage device can provide reduces. By drawing power from multiple energy storage devices, the amount of current drawn from each energy storage device is less than if all the power were drawn from a single energy storage device, resulting in less reduction of available energy from the energy storage devices.

The prediction module 214B represents functionality operable to determine values for various characteristics of estimated or predicted user behavior (e.g., predicting the intent of the user), program behavior (e.g., predicting how the software installed is using/causing usage of the system, such as an antivirus service), and/or more general usage of the computing device 102. This predicted behavior or usage can include, for example, removal or insertion of hot-swappable batteries that are part of the energy storage device system 128, connection of the computing device 102 to an AC power source, expected future workload and/or power usage of the computing device 102, and so forth.

In one or more embodiments, the predicted behavior or usage includes energy storage device presence predictions. An energy storage device can optionally be an energy storage device that can be removed from (and optionally is external to) the housing that includes other components of the computing device 102 (such as the processing system 104). The energy storage device can be implemented in various manners, such as a removable energy storage device (e.g., a hot-swappable battery that can be inserted into and withdrawn from the housing during operation of the computing device 102 while the computing device 102 is not powered off, or a cold-swappable battery that may be removed only when the computing device is not functional (e.g., is powered off)), an energy storage device in a removable peripheral device (e.g., an energy storage device in a keyboard coupled to the housing), an energy storage device in a case or protective cover of the computing device 102, and so forth.

A value is obtained for each energy storage device indicating whether the energy storage device is predicted to be no longer present (e.g., removed) in the near future and whether other energy storage devices in the computing device 102 are predicted to be able to provide the power to the computing device 102 for the duration that the energy storage device is not present. For example, a value of 1 or True can be used to indicate that the energy storage device is predicted to be removed in the near future and the other energy storage devices in the computing device 102 are not predicted to be able to provide power to the computing device 102 for the duration that the energy storage device is not present, and a value of 0 or False can be used to indicate that the energy storage device is not predicted to be removed in the near future and/or the other energy storage devices in the computing device 102 are able to provide power to the computing device 102 for the duration that the energy storage device is not present. By way of another example, a non-binary value may be used to indicate whether the energy storage device is predicted to be no longer present (e.g., removed) in the near future and whether other energy storage devices in the computing device 102 are predicted to be able to provide the power to the computing device 102 for the duration that the energy storage device is not present, such as a probability value (e.g., a percentage ranging from 0% to 100%) of how likely it is that the energy storage device will be removed in the near future and the other energy storage devices in the computing device 102 not be able to provide power to the computing device 102 for the duration that the energy storage device is not present.

The energy storage device selection module 216B can use the values representing whether the energy storage devices are predicted to be no longer present (e.g., removed) in the near future and whether other energy storage devices in the computing device 102 are able to provide the power to the computing device 102 for the duration that the energy storage device is not present in various different manners. In one or more embodiments, if an energy storage device is predicted to be removed in the near future and the other energy storage devices in the computing device 102 are not predicted to be able to provide power to the computing device 102 for the duration that the energy storage device is not present, then the energy storage device selection module 216B selects to draw power from an the energy storage device that is predicted to be removed in the near future. By drawing power from the energy storage device that is predicted to be removed in the near future, power in the remaining energy storage devices that are not predicted to be ejected or removed can be conserved.

In one or more embodiments, an energy storage device predicted to be removed in the near future refers to an energy storage device that is predicted to be removed within some threshold value. This threshold value can be, for example, a threshold amount of time of the current time (such as on the order of minutes or hours, such as 10 minutes or 2 hours). This threshold value can also be a threshold amount of energy, such as an absolute energy value or a percent value.

The prediction module 214B can estimate or predict that an energy storage device is to be removed in the near future in a variety of different manners. In one or more embodiments, the prediction module 214B maintains a record (e.g., over a matter of weeks or months) indicating times of the day and/or days of the week that the energy storage device is present and times of the day and/or days of the week that the energy storage device is not present. From this record, the prediction module 214B can identify usage patterns that indicate when the energy storage device is not present at the computing device 102 and the durations when the energy storage device is not present at the computing device 102. Any of a variety of public and/or proprietary techniques can be used to analyze the record to identify usage patterns.

For example, if every Monday (or at least a threshold number of Mondays, such as 80%) from 3:00 pm-5:00 pm the energy storage device is not present at the computing device 102, then the prediction module 214B can predict that on the following Monday from 3:00 pm-5:00 pm the energy storage device will not be present at the computing device 102. By way of another example, if every day of the week (or at least a threshold number of days, such as 75%) from noon-1:00 pm the energy storage device is not present at the computing device 102, then the prediction module 214B can predict that, if it is currently 11:00 am, the energy storage device will not be present at the computing device 102 from noon-1:00 pm on the current day.

Additionally or alternatively, the prediction module 214B can estimate or predict that an energy storage device is to be removed in the near future based on any of a variety of other data. The prediction module 214B can obtain data from various different sources and analyze the data using any of a variety of public and/or proprietary techniques to identify expected future usage patterns.

By way of example, the prediction module 214B can obtain data from a calendar of the user of the computing device 102. The calendar can include appointments or meetings with locations away from the user's office or home, and the prediction module 214B can predict, for example, that an energy storage device will not be present at the computing device 102 during those appointments or meetings.

By way of example, the prediction module 214B can obtain data from a cloud service that collects usage data for computing devices. The cloud service can provide an indication of times of the day and/or days of the week when users of computing devices of the same type as computing device 102 have an energy storage device not present. The prediction module 214B can predict, for example, that an energy storage device will not be present at the computing device 102 during those times of the day and/or days of the week indicated by the cloud service.

The prediction module 214B can estimate or predict various timing information regarding when the computing device is to be connected to an AC power source, such as how soon the computing device will be connected to an AC power source and/or for how long (a duration that) the computing device will be connected to the AC power source. In one or more embodiments, the predicted behavior or usage includes predicted connection of the computing device 102 to an AC power source in the near future and/or a duration of the connection to the AC power source. A value is determined indicating whether the computing device 102 is predicted to be connected to an AC power source (and thus allow charging of the energy storage devices and/or powering of the computing device 102 on AC power rather than power drawn from the energy storage devices) in the near future. For example, a value of 1 or True can be used to indicate that the computing device is predicted to be connected to an AC power source in the near future, and a value of 0 or False can be used to indicate that the computing device is not predicted to be connected to an AC power source in the near future. By way of another example, various non-binary values can be used. For example, values indicating how much power can be delivered by the AC power source that the computing device is predicted to be connected to can be generated, values indicating how long the computing device is expected to be connected to the AC power source can be generated, values indicating how much energy is expected to be drawn from the AC power source for the duration that the computing device is connected to the AC power source can be generated, and so forth.

The energy storage device selection module 216B can use these values in various different manners. For example, if the computing device is predicted to be connected to an AC power source in the near future, then the energy storage device selection module 216B selects to draw power from energy storage devices in a balanced manner. This balanced manner can include, for example, duty cycling power from the energy storage devices in order to balance battery wear.

By way of another example, the energy storage device selection module 216B can determine to draw power from the energy storage devices in a balanced manner in response to the computing device being predicted to be connected to an AC power source in the near future and each of the energy storage devices having sufficient charge to power the computing device 102 until the computing device 102 is attached to an AC power source. This allows the energy storage device selection module 216B to pro-actively manage aging of the energy storage device. If one or more of the energy storage devices do not have sufficient charge to power the computing device 102 until the computing device 102 is attached to an AC power source then various other actions can be taken, such as drawing more power from the energy storage device having a higher charge than the other energy storage device.

By way of yet another example, the energy storage device selection module 216B can determine to save the energy in the internal energy storage device if the computing device is not predicted to be connected to an external power source such as an AC power source, a wireless power source, or an external energy storage device, long enough to deliver a particular amount of energy to charge the energy storage devices.

In one or more embodiments, the computing device can use the predicted timing information for when the computing device is to be connected to an AC power source in various manners, such as comparing the values to various different threshold values. This threshold value can be, for example, a threshold amount of time (such as on the order of minutes or hours, such as 15 minutes or 3 hours) regarding how soon in the future from the current time the computing device is predicted to be connected to an AC power source, a threshold amount of time (such as on the order of minutes or hours, such as 5 minutes or 2 hours) regarding how long the computing device is predicted to be connected to an AC power source, and so forth. This threshold value can also be a threshold amount of energy, such as an absolute energy value or a percent value. This threshold amount of energy can be, for example, an amount of energy that the AC power source the computing device is predicted to be connected to is able to deliver for the expected duration that the computing device is connected to the AC power source.

The prediction module 214B can estimate or predict timing information for when the computing device is to be connected to an external power source in a variety of different manners. In one or more embodiments, the prediction module 214B maintains a record (e.g., over a matter of weeks or months) indicating times of the day and/or days of the week that the computing device connected to an AC power source. From this record, the prediction module 214B can identify usage patterns that indicate when the computing device is connected to an AC power source and the durations when the computing device is connected to an AC power source. Any of a variety of public and/or proprietary techniques can be used to analyze the record to identify usage patterns.

For example, if every Sunday (or at least a threshold number of Sundays, such as 80%) from noon to midnight the computing device is connected to an AC power source, then the prediction module 214B can predict that on the following Sunday from noon to midnight the computing device will be connected to an AC power source. By way of another example, if every day of the week (or at least a threshold number of days, such as 75%) from midnight to 6:00 am the computing device is connected to an AC power source, then the prediction module 214B can predict that, if it is currently 11:00 pm, the computing device will be connected to an AC power source the following day from noon to 6:00 am.

Additionally or alternatively, the prediction module 214B can estimate or predict timing information for when the computing device will be connected to an AC power source based on any of a variety of other data. The prediction module 214B can obtain data from various different sources and analyze the data using any of a variety of public and/or proprietary techniques to identify expected future usage patterns.

By way of example, the prediction module 214B can obtain data from a calendar of the user of the computing device 102. The past usage data (the record indicating times of the day and/or days of the week that the computing device connected to an AC power source) can be compared to the user's calendar and a determination made that during meetings (or meetings at particular locations) the computing device is connected to an AC power source. The prediction module 214B can predict, for example, that the computing device will be connected to an AC power source during upcoming meetings (or meetings at particular locations) identified in the user's calendar.

By way of example, the prediction module 214B can obtain location data for the computing device 102, such as from a location awareness module of the computing device 102 (e.g., using a global positioning system (GPS), Bluetooth, Wi-Fi, triangulation, etc.). The past usage data (the record indicating times of the day and/or days of the week that the computing device connected to an AC power source) can be compared to the user's locations and a determination made that at certain locations (e.g., home) the computing device is connected to an AC power source. The prediction module 214B can predict, for example, that the computing device will be connected to an AC power source if the user is currently within a threshold distance (e.g., one mile) of home, but not connected to an AC power source if the user is currently within a threshold distance (e.g., one mile) of work and heading towards work (based on calendar entries, meeting appointments, heading on map/navigation application, etc.).

By way of example, the prediction module 214B can obtain data from a cloud service that collects usage data for computing devices. The cloud service can provide an indication of times of the day and/or days of the week when users of computing devices of the same type as computing device 102 have their computing devices connected to an AC power source. The prediction module 214B can predict, for example, that the computing device will be connected to an AC power source during those times of the day and/or days of the week indicated by the cloud service.

In one or more embodiments, the predicted behavior or usage includes expected future workload and/or power usage of the computing device 102. The expected future workload and/or power usage of the computing device 102 is determined, and a determination is made as to whether there is sufficient charge in the energy storage devices to perform the expected future workload and/or power usage of the computing device 102. A value is determined indicating whether there is sufficient charge in the energy storage devices to perform the expected future workload and/or power usage of the computing device 102. The expected future workload and/or power usage of the computing device 102 can be used, for example. as a factor in determining whether the charge in the energy storage devices is sufficient for some amount of time.

The energy storage device selection module 216B can use the values representing whether there is sufficient charge in the energy storage devices to perform the expected future workload and/or power usage of the computing device 102 in various different manners. In one or more embodiments, if there is sufficient charge in the energy storage devices to perform the expected future workload and/or power usage of the computing device 102, then the energy storage device selection module 216B selects to draw power from energy storage devices in a balanced manner. This balanced manner can include, for example, duty cycling power from the energy storage devices.

The energy storage device selection module 216B optionally determines to draw power from the energy storage devices in a balanced manner in response to there being sufficient charge in the energy storage devices to perform the expected future workload and/or power usage of the computing device 102. If one or more of the energy storage devices do not have sufficient charge to perform the expected future workload and/or power usage of the computing device 102 then various other actions can be taken, such as drawing more power from the energy storage device having a higher charge than the other energy storage device, drawing power from the energy storage devices based on the predicted availability of the energy storage devices, and so forth.

The prediction module 214B can estimate or predict the expected future workload and/or power usage of the computing device 102 in a variety of different manners. The prediction module 214B estimates or predicts the expected future workload and/or power usage of the computing device 102 as an aggregate function of location, user activity, and derived intent. In one or more embodiments, the prediction module 214B maintains a record (e.g., over a matter of weeks or months) indicating times of the day and/or days of the week and the power usage during those times and/or days. From this record, the prediction module 214B can identify usage patterns that indicate power usage of the computing device 102. Any of a variety of public and/or proprietary techniques can be used to analyze the record to identify usage patterns based on time and/or day. Additionally or alternatively, the prediction module 214B maintains a record of applications run on the computing device 102 and the power usage while those applications are run. From this record, the prediction module 214B can identify usage patterns that indicate power usage of the computing device 102 based on application(s) running. Any of a variety of public and/or proprietary techniques can be used to analyze the record to identify usage patterns.

For example, if every Monday (or at least a threshold number of Mondays, such as 80%) from 7:00 am to 10:00 am a particular amount of power (e.g., 1500 milliwatt hours (mWh)) is used, then the prediction module 214B can predict that on the following Monday from 7:00 am to 10:00 am the computing device will use that same particular amount of power (e.g., 1500 mWh). By way of another example, if every day of the week (or at least a threshold number of days, such as 75%) from noon to 1:00 pm the computing device uses a particular amount of power (e.g., 30 mWh), then the prediction module 214B can predict that, if it is currently 11:00 am, the computing device will use 30 mWh from noon to 1:00 pm today. By way of yet another example, if every time (or at least a threshold number of times, such as 70%) an image processing application is run on the computing device the computing device uses 1000 milliwatts per hour (mW/h), then the prediction module 214B can predict that, if that image processing is currently running on the computing device then the computing device will currently use 1000 mW/h.

Additionally or alternatively, the prediction module 214B can estimate or predict the expected future workload and/or power usage of the computing device 102 based on any of a variety of other data. The prediction module 214B can obtain data from various different sources and analyze the data using any of a variety of public and/or proprietary techniques to identify expected future usage patterns.

By way of example, the prediction module 214B can obtain data from a calendar of the user of the computing device 102. The past usage data (the record indicating times of the day and/or days of the week and the power usage during those times and/or days) can be compared to the user's calendar and a determination made that during meetings (or meetings at particular locations) the computing device uses a particular amount of power (e.g., 50 mW/h). The prediction module 214B can predict, for example, that the computing device will also use 50 mW/h during upcoming meetings (or meetings at particular locations) identified in the user's calendar, or more than 50 mW/h (e.g., 70 mW/h) if the user is marked as meeting presenter.

By way of example, the prediction module 214B can obtain data from a calendar and/or digital personal assistant (e.g., the Cortana® personal assistant) of the user of the computing device 102. The prediction module 214B can predict, given this obtained data, when the user will be away from the computing device 102 (e.g., for a meeting, for coffee, etc.). The prediction module 214B can further predict, for example, that the computing device will use a small amount of power (e.g., 5 mW/h) while the user is away from the computing device 102.

By way of example, the prediction module 214B can obtain location data for the computing device 102, such as from a location awareness module of the computing device 102. The past usage data (the record indicating times of the day and/or days of the week and the power usage during those times and/or days) can be compared to the user's locations and a determination made that at certain locations (e.g., home) the computing device uses a particular amount of power (e.g., 100 mW/h). The prediction module 214B can predict, for example, that the computing device will also use 100 mW/h when the user is next at home.

By way of example, the prediction module 214B can obtain data from a cloud service that collects usage data for computing devices. The cloud service can provide an indication of times of the day and/or days of the week and the power usage during those times and/or days for other computing devices of the same type as computing device 102. The prediction module 214B can predict, for example, that the computing device will use similar or the same amount of power during those times of the day and/or days of the week indicated by the cloud service.

Given the information from the static criteria determination module 210B, the dynamic system criteria determination module 212B, and/or the prediction module 214B, the energy storage device selection module 216B can readily select which energy storage devices 202 power is to be drawn from at any particular time. The determination of which energy storage device(s) 202 to draw power from can be made at various times, such as at regular or irregular intervals (e.g., some time duration), in response to certain events (e.g., a temperature in thermal zone satisfying a threshold value, such as 80% of a maximum temperature desired by a designer or supplier of the computing device 102), and so forth.

In one or more embodiments, the energy storage device selection module 216B uses the individual criteria as discussed above. The energy storage device selection module 216B can use individual criteria or alternatively any combination of criteria. For example, if an energy storage device is predicted to be removed in the near future and there is not sufficient power to power the computing device 102 for the duration that the energy storage device is not present (e.g., due to other energy storage devices in the computing device 102 being unable to provide the power, the computing device not being predicted to be connected to an AC power source in the near future, and so forth), then the energy storage device selection module 216B selects to draw power from an the energy storage device that is predicted to be removed in the near future. This conserves charge in the other energy storage devices in the computing device 102 when they are not predicted to have sufficient power for all desired future use and/or power cannot be replenished to those other energy storage devices.

Additionally or alternatively, the energy storage device selection module 216B can apply various different rules or algorithms to determine which energy storage device(s) 202 to draw power from at any given time. In one or more embodiments, the energy storage device selection module 216B attempts to satisfy all the criteria used by the energy storage device discharge selection system 126C. Although various criteria are discussed herein, it should be noted that not all of the criteria discussed herein need by used by the energy storage device discharge selection system 126C. Additionally or alternatively, additional criteria can also be used by the energy storage device discharge selection system 126C.

If all of the criteria used by the energy storage device discharge selection system 126C can be satisfied, then the energy storage device selection module 216B selects which energy storage device(s) to draw power from at any given time so that all the criteria used by the energy storage device discharge selection system 126C are satisfied. However, situations can arise where all of the criteria cannot be satisfied. For example, the closest energy storage device 202 to a particular component may be in a thermally hot zone, so one criteria may indicate to use that energy storage device but another criteria indicates not to use that energy storage device.

In one or more embodiments, each criteria is assigned a different classification. Various different classification levels with various different labels can be used, and these classification levels can be assigned statically and/or dynamically.

Any of a variety of different classification names or labels can be used. One example of classification levels is (in order of priority or importance) critical, important, and informational. Other classification levels or labels can alternatively be used, such as a number or an "importance" value (e.g., 0 through 100). Higher classification levels are given priority over lower classification levels. For example, assume that proximity of components to the energy storage devices powering the components is given a classification level of important, and the energy storage device being in a thermally stable zone is given a classification level of critical (which is higher than important). If the most energy efficient energy storage device 202 for a particular component is in a thermally hot zone, then the energy storage device selection module 216B selects an energy storage device 202 to power the component other than the most energy efficient energy storage device 202 because selecting an energy storage device in a thermally stable zone is given priority over selecting the energy storage device that is most energy efficient. The other energy storage device 202 that is selected by the energy storage device selection module 216B can be, for example, the most energy efficient energy storage device 202 for the component that is in a thermally stable zone.

In one or more embodiments, situations can also arise in which criteria at the same classification level conflict with one another. Such situations can be resolved in various manners, such as by using priority levels assigned to the different criteria. These priority levels can be assigned statically and/or dynamically. Any of a variety of different priority names or labels can be used. One example of labels is (in order of priority or importance) high, medium, and low. If two different criteria having the same classification level conflict (e.g., one criteria indicates that a particular energy storage device should be used and another indicates that particular energy storage device should not be used), then the energy storage device selection module 216B applies the criteria having the higher priority. However, if two different criteria having the same priority level but different classification levels conflict, then the energy storage device selection module 216B applies the criteria having the higher classification level.

The evaluation of classifications levels and priority levels can alternatively be performed in the reverse order. For example, if two different criteria conflict (e.g., one criteria indicates that a particular energy storage device should be used and another indicates that particular energy storage device should not be used), then the energy storage device selection module 216B applies the criteria having the higher priority. Situations can arise in which criteria at the same priority level conflict with one another. Such situations can be resolved in various manners, such as by using classification levels assigned to the different criteria. E.g., if two different criteria having the same priority level conflict (e.g., one criteria indicates that a particular energy storage device should be used and another indicates that particular energy storage device should not be used), then the energy storage device selection module 216B applies the criteria having the higher classification level.

In one or more embodiments, the energy storage device selection module 216B applies battery age balancing in selecting energy storage devices. The battery age balancing can be considered an additional criteria. Battery age balancing refers to the act of using two or more energy storage devices such that they are used proportionally according to their size, chemistry, and designed cycle count. In other words, the act of age balancing intends to use the least degraded batteries as much as possible. Many energy storage devices degrade (e.g., lose capacity) as the number of charge/discharge cycles they've undergone increases. By performing battery age balancing, energy storage device degradation is reduced in the computing device 102 (e.g., the energy storage devices degrade at approximately the same rate).

In one or more embodiments, the energy storage device selection module 206 can also reduce the performance of hardware components. Reducing the performance of a hardware component refers to reducing the amount of heat generated by the component, typically by running the hardware component at a slower frequency or rate. For example, the performance of a processing unit can be reduced by slowing the frequency at which the processing unit runs (e.g., from 1.2 gigahertz (GHz) to 800 megahertz (MHz)).

In one or more embodiments, the energy storage device selection module 206 can also influence operation of software components. This can be done in various manners, such as by limiting performance, by putting resource constraints and/or budget on the software (currently in operation or due to run in the future), by means of suspending operation (by means of postponing running of software or cancelling it all together), combinations thereof, and so forth.

The energy storage device selection module 206 can determine to reduce the performance of a hardware component in various different manners. In one or more embodiments, the energy storage device selection module 206 determines to reduce the performance of a hardware component in order to satisfy one or more of the criteria discussed above. For example, if an energy storage device is predicted to be removed in the near future and the other energy storage devices in the computing device 102 are not predicted to be able to provide power to the computing device 102 for the duration that the energy storage device is not present, and if the energy storage device is located in a thermally hot zone, the energy storage device selection module 216B can determine to continue to draw power from that energy storage device (because it is expected to be removed in the near future), and furthermore determine to reduce the performance of a graphics processing unit in that same thermally hot zone to reduce the temperature in that thermal zone (or at least to counteract the increase in temperature in the thermal zone as a result of drawing power from the energy storage device).

It should also be noted that although discussions are made herein to selecting which energy storage device to draw power from, the selection can additionally or alternatively be a selection of what ratio to draw power from multiple different energy storage devices. For example, using the criteria discussed herein the energy storage device selection module 216B can select two energy storage devices (e.g., two energy storage devices in the same thermal zone) and draw power from both (e.g., 50% power from both, more power (e.g., 75% of the desired power) from the energy storage device that is most efficient for the component and the remaining power (e.g., 25% of the desired power) from the other energy storage device in the thermal zone), and so forth.

The techniques discussed herein provide a dynamic approach to selecting which of multiple energy storage devices to draw power from. This dynamic approach various based on multiple different criteria, and can factor in the way in which a user uses his or her computing device. Thus, rather than having a one-size-fits-all approach to selecting an energy storage device to draw power from, the dynamic approach discussed herein is customized or tailored to the individual user. This results in reducing the energy loss in energy storage devices during operation of the computing device, approximately uniform aging of energy storage devices, improved thermal stability of the computing device, and extended usability of the computing device.

Generally speaking, an energy storage device system 128 having multiple energy storage devices may be configured in various ways and employ a variety of different types of energy storage devices. The references to an energy storage device herein can refer to an individual battery cell, a collection of battery cells, a collection of battery cells managed by a smart battery controller, combinations thereof, and so forth. In one or more implementations, different energy storage devices 202 included with a system have different characteristics, such as differences in one or more of battery chemistry, capacity, voltage, size, and/or shapes, to name a few examples. Using different types of energy storage devices provides flexibility for design of the energy storage device system and circuit boards, and consequently enables device developers to make better utilization of internal space to provide devices having increased battery life and efficiency. The different energy storage devices are arranged in a circuit that enables selective switching among the energy storage devices.

Figure 4B:
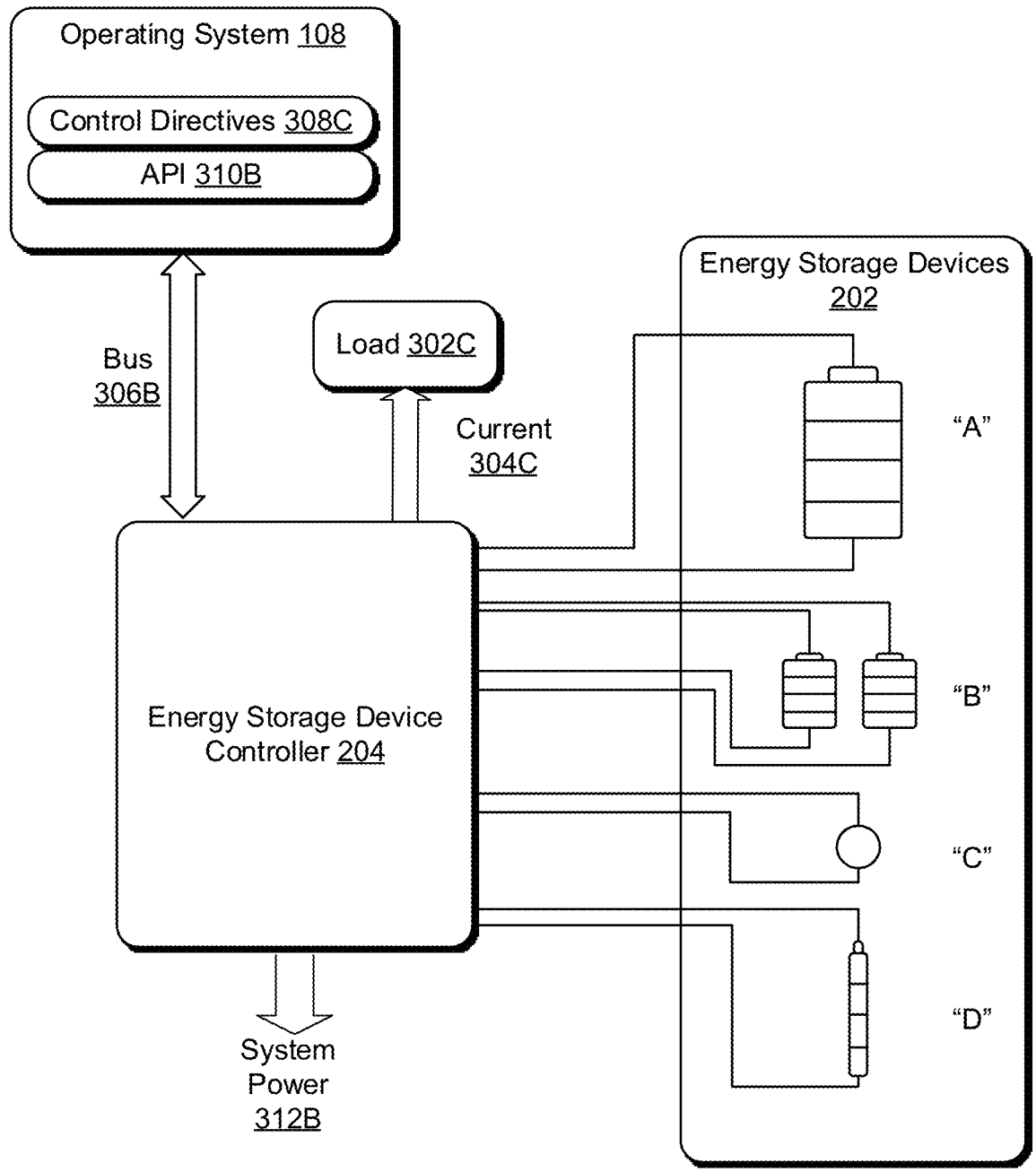
FIG. 4B depicts a discharging architecture for an energy storage device system.

In particular, FIG. 4B depicts a discharging architecture for an energy storage device system having multiple energy storage devices 202. The energy storage devices 202 may be connected in a circuit that includes an energy storage device controller 204 as described in relation to the example of FIG. 2A and/or FIG. 2B. In the depicted example, energy storage devices 202 include different representative energy storage devices labeled "A", "B", "C", and "D". Each of the energy storage devices is connected directly to the charge energy storage device 204 in a manner that provides individual current paths to and from each of the energy storage devices for charging and/or discharging. The depicted energy storage devices 202 are also represented as a collection of heterogeneous energy storage devices, although the energy storage devices 202 can alternatively be the same types of energy storage devices.

The energy storage device controller 204 is depicted as being connected to a load 302 to which current 304 drawn from the energy storage devices 202 can be provided. To draw current from the energy storage devices 202 and perform the discharging, the energy storage device controller 204 may implement a discharging strategy that selects different energy storage devices for discharging at different times as determined by the energy storage device selection module 216B as previously discussed. When power is drawn from the energy storage devices, switching hardware 206 of the energy storage device controller 204 can direct the current be drawn from the energy storage devices using the individual current paths (e.g., on a per-energy storage device basis).

As further represented in FIG. 4B, the energy storage device controller 204 may be configured to coordinate discharging activity with an operating system 108 via communications exchanged via a bus 306 (e.g., an I2C bus or other suitable communication bus) or other suitable communication channel. In particular, the operating system 108 may include an energy storage device selection module 216B or comparable functionally that is operable to direct operation of the energy storage device controller 204 as discussed herein. In order to do so, the operating system 108 may communicate control directives 308C to the energy storage device controller 204 that provides indications regarding which energy storage devices 202 to discharge at which times. The control directives 308C are configured to dynamically program the energy storage device controller 204 to discharge (draw current from) the desired energy storage devices 202 at the desired times as indicated by the energy storage device selection module 216B.

Control directives 308C may be configured as any suitable messages, signals, or communications that are effective to convey information regarding policy decisions and selected strategies to set-up the energy storage device controller 204 accordingly. By way of an example and not limitation, the API 310B may be used by the energy storage device selection module 216B and/or other applications to interact with and configure the energy storage device controller 204. In one approach, the API 310B may be invoked to communicate control directives 308C that are configured to set registers of the energy storage device controller 204. In any event, the control directives 308C provide a mechanism to access and manipulate discharging functionality provided via the energy storage device controller 204 to implement different strategies and tailor charging to different scenarios.

Figure 4C:
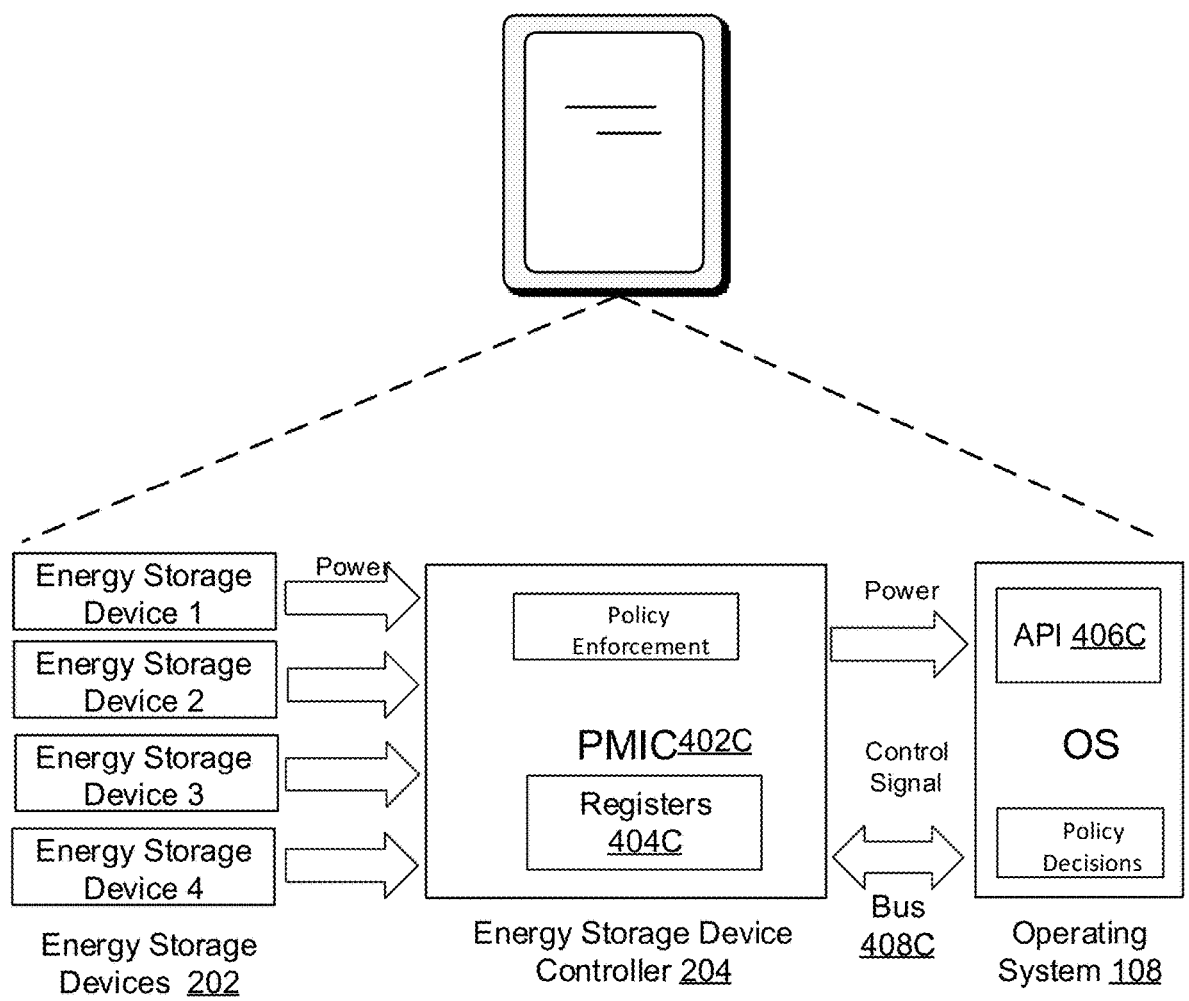
FIG. 4C depicts a system having multiple energy storage devices.

FIG. 4C depicts a system having multiple energy storage devices in accordance with one or more implementations. In particular, the example of FIG. 4C depicts a system having energy storage devices 202 that may be integrated with a computing device 102. Power is supplied via the energy storage devices using the techniques discussed herein, such as via an energy storage device controller 204, which includes switching hardware 206 and control logic 208. In the depicted example, the energy storage device controller 204 is implemented via a power management integrated circuit (PMIC) 402C that is adapted to support energy storage device switching. For instance, in one or more implementations, the PMIC or other energy storage device controller is adapted to include registers 404C to facilitate policy enforcement of a switching policy. The registers 404C may be configured to hold various parameters that the control logic 208 makes use of to control operation of switching hardware 206 and supply power from the energy storage devices accordingly. For example, registers 404C may include registers indicative of the determined power ratio, the switching policy, a selected switching mode, a timing register, and battery cell specific registers indicative of battery states, characteristics, and designated current switching constraints (amounts, weights, percentages, thresholds, etc.). Registers may be assigned default values selected for general usage in typical scenarios. Registers may then be selectively adapted under the influence of the operating system and/or user input to implement policy settings for different use cases.

The registers 404C implemented by the energy storage device controller 204 are exposed to enable operating system 108 control over switching. In other words, the registers 404C provide user accessible control over energy storage device switching. By way of example and not limitation parameter values for the registers 404C may be set and updated dynamically via an application programming interface (API) 406C that is exposed via the operating system 108 as represented in FIG. 4A. Rather than API calls, parameter values for the registers 404C may be provided as data structures exchanged to express policy and control asserted from the energy storage device discharge selection system 126C (e.g., manifested in the operating system 108) to the energy storage device controller 204. API messages, data structures, and/or other control signals may be exchanged between the energy storage device controller 204 and the operating system 108 over a suitable communication bus 408C, one example of which is an I2C bus. Information regarding energy storage device states, workload, and characteristics of energy storage devices 202 may also be communicated to the operating system 108 and/or energy storage device discharge selection system 126C via the control signals and/or API to facilitate assessments of the operational context and policy decisions based on the operational context.

It should be noted that, in one or more embodiments, the PMIC 402C hosts logic for the energy storage device discharge selection system 126C and/or the energy storage device controller 204. This aids efficiency and speed of decision making. In situations in which the PMIC 402C hosts the energy storage device discharge selection system 126C logic, part of the energy storage device discharge selection system 126C that is manifested in the operating system 108 is responsible for dictating policies to the part of the energy storage device discharge selection system 126C manifested inside the PMIC 402C.

Thus, as represented in FIG. 4C, the operating system 108, by way of an energy storage device discharge selection system 126C or otherwise, may make policy decisions such as mode selection and energy storage device constraints setting for energy storage device switching. Policy decisions are made based upon performance parameters indicative of an operational context including at least information regarding battery states and characteristics obtained from the battery controller 204. The API 406C provides a mechanism by which control signals are communicated to the energy storage device controller 204 to set the registers 404C in accordance with the policy decisions. Thus, the operating system 108 and/or energy storage device discharge selection system 126C may direct operation of energy storage device controller 204 to implement policy enforcement of a selected policy by setting the registers 404C and causing operation of switching hardware 206 to effectuate the modes and energy storage device constraints specified by the policy. Power is then supplied to the system via one or more of the energy storage devices in accordance with the policy decisions.

It should be noted that although various different values, labels, levels, and so forth are discussed herein, these are examples and the techniques discussed herein are not limited to these examples. For example, any specific threshold values and/or labels discussed herein are only examples, and various other threshold values and/or labels can additionally or alternatively be used. These examples are illustrations only and are not intended to limit the scope of the techniques discussed herein.

Figure 4D:
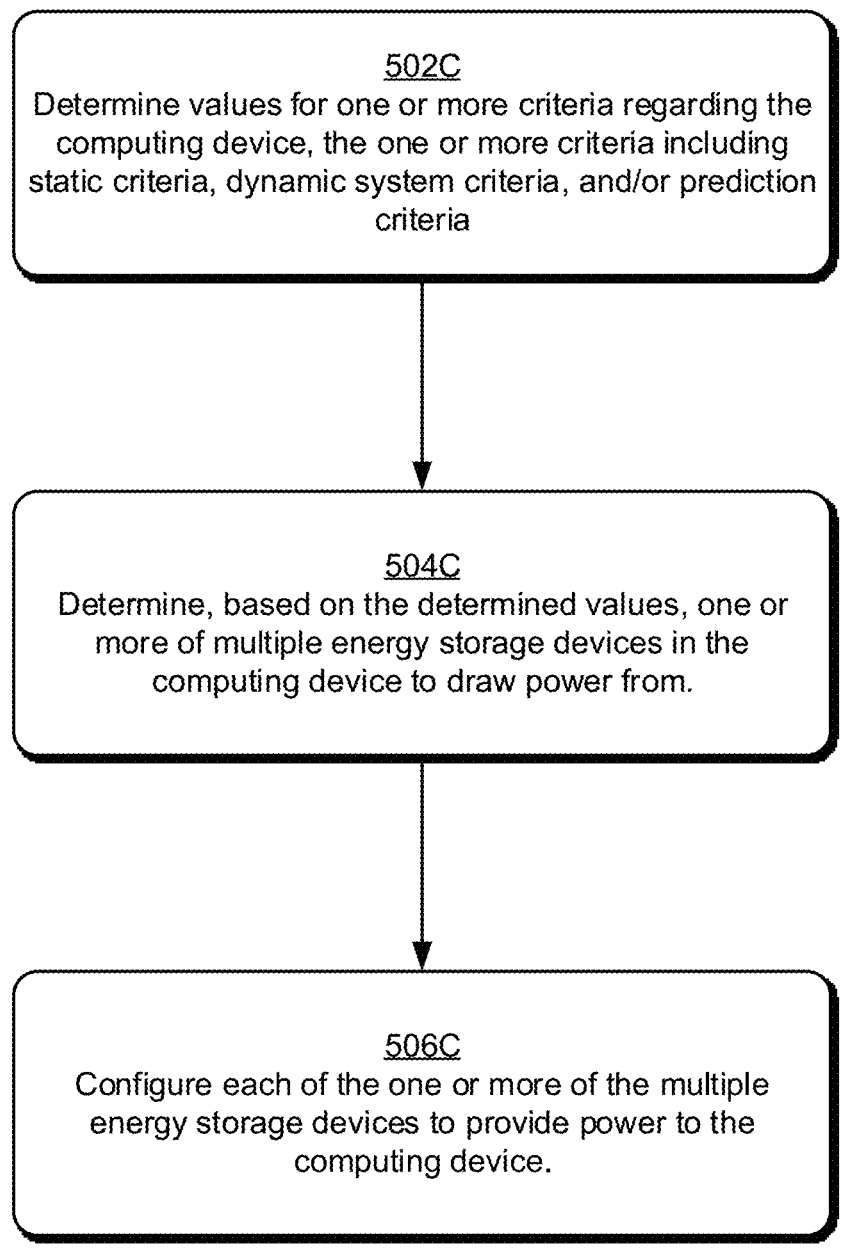
FIG. 4D is a flow diagram of an example procedure for dynamic energy storage device discharging.

Further aspects of the dynamic energy storage device discharging techniques are discussed in relation to example procedure of FIG. 4D. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks.

FIG. 4D is a flow diagram for dynamic energy storage device discharging in accordance with one or more implementations. The procedure shown in FIG. 5 describes details of drawing power from multiple energy storage devices. The procedure can be implemented by way of a suitably configured computing device, such as by way of an operating system 108, energy storage device discharge selection system 126C, and/or other functionality described in relation to the examples discussed above.

Values for one or more criteria regarding the computing device are determined (block 502C). The one or more criteria can be static criteria, dynamic system criteria, and/or prediction criteria. By way of example, the values can be the temperatures of each of multiple thermal zones in a computing device.

One or more of multiple energy storage devices in the computing device to draw power from are determined based on the determined values (block 504C). Power can be drawn from a single energy storage device, or alternatively from multiple energy storage devices.

Each of the one or more energy storage devices is configured to provide power to the computing device (block 506C). Energy is drawn from the one or more energy storage devices based on their configuration.

Example System

Figure 5:
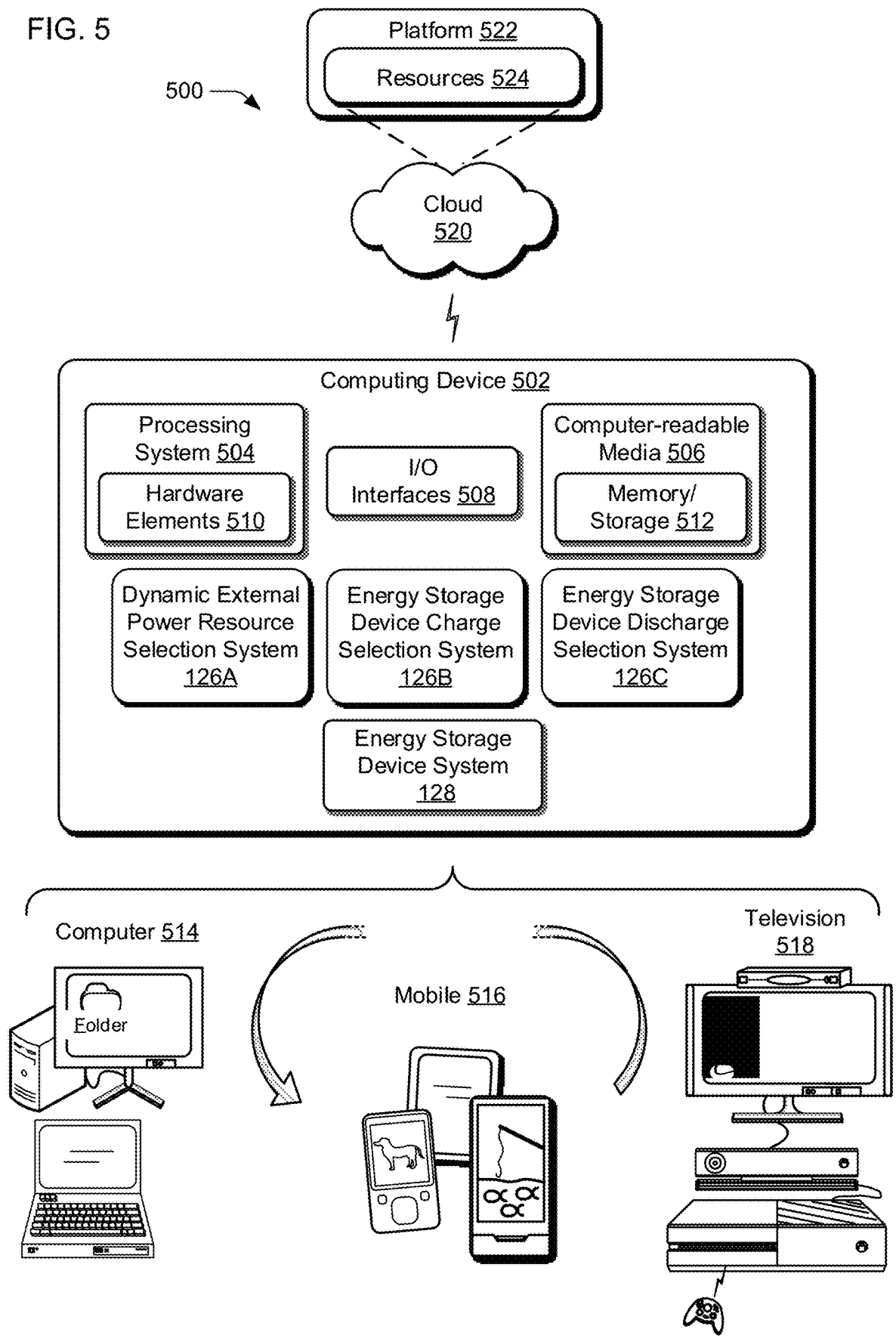
FIG. 5 illustrates an example computing device that is representative of one or more computing systems and/or devices that may implement the various techniques described herein.

FIG. 5 illustrates an example system 500 that includes an example computing device 502 that is representative of one or more computing systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 502, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, dynamic external power resource selection system 126, and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on. The computing device 502 may also be implemented as the television 518 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This is illustrated through inclusion of the dynamic external power resource selection system 126A, the energy storage device charge selection system 126B, the energy storage device discharge selection system 126A, the energy storage device charge selection system 126B, the energy storage device discharge selection system 126C and the energy storage device system 128, and the energy storage device system 128 on the computing device 502. The functionality represented by dynamic external power resource selection system 126A, the energy storage device charge selection system 126B, the energy storage device discharge selection system 126C, and other modules/applications may also be implemented all or in part through use of a distributed system, such as over a "cloud" 520 via a platform 522 as described below.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of functionality described herein may be distributed throughout the system 500. For example, the functionality may be implemented in part on the computing device 502 as well as via the platform 522 that abstracts the functionality of the cloud 520.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

The invention claimed is:

1. A computing device comprising:
   processing hardware;
   a memory storage device;
   a battery connector comprising at least one of: a wired battery connector or a wireless battery connector;
   an alternating current (AC) power source connector comprising at least one of: a wired AC power source connector or a wireless AC power source connector; and
   a battery connectable to the battery connector;
   wherein the memory storage device stores computer-executable instructions, which, when executed by the processing hardware, cause the processing hardware to:
      obtain usage data comprising:
         at least one of: a first prior connection action directed to the battery connector or a second prior connection action directed to the AC power source connector, wherein a connection action comprises at least one of: a connection or a disconnection; and
         location history of the computing device;
      generate, based on the usage data, a prediction of a future connection action based on a location of the computing device and the location history of the computing device, wherein the future connection action comprises at least one of a disconnection between the battery connector and the battery or a connection between the AC power source connector and an AC power source; and
      select a first portion of the first battery to provide more power to the computing device than a second portion of the battery, the selecting being based on the prediction of the future connection action and ages of the first portion of the battery and the second portion of the battery.

2. A computing device according to claim 1, wherein the usage data includes energy storage device information indicating types and/or energy capacities of batteries previously connected to the battery connector, and wherein the prediction is based on the energy storage device information.

3. A computing device according to claim 1, wherein the prediction of the future connection action is that the battery will be disconnected from the battery connector.

4. A computing device according to claim 1, wherein the selecting is further based on a first amount of charge in the first portion of the battery and a second amount of charge in the second portion of the battery.

5. A computing device according to claim 1, wherein the prediction of the future connection action is the connection between the AC power source and the AC power source connector.

6. A computing device according to claim 1, wherein the selecting is further based on duty cycling.

7. A computing device according to claim 1, wherein the usage data includes at least one of: characteristics of another battery previously connected to the battery connector or characteristics of the AC power source connected to the AC power source connector, wherein the prediction of the future connection action is further based on at least one of: the characteristics of the other battery or the characteristics of the AC power source.

8. A computing device according to claim 7, wherein the characteristics of the other battery include at least one of: capacity, age, or a type of battery, and wherein the characteristics of the AC power source include at least one of: capacity, age, or a type of AC power source.

9. A computing device according to claim 1, wherein the first portion of the battery is one or more battery cells of the battery and the second portion of the battery is one or more other battery cells of the battery.

10. A computing device according to claim 1, wherein the second portion of the battery provides no power to the computing device.

11. A computing device according to claim 1, wherein the selecting is further based on static criteria of the computing device, the static criteria remaining unchanged during operation of the computing device.

12. A computing device according to claim 1, wherein the selecting is further based on dynamic system criteria of the computing device, the dynamic system criteria changing during operation of the computing device.

13. A computing device according to claim 12, wherein the dynamic system criteria comprises temperatures within one or more thermal zones of the computing device.

14. A method of controlling battery power provided to a computing device, the method comprising:
   obtaining usage data comprising:
      at least one of: a first prior connection action directed to a battery connector of the computing device or a second prior connection action directed to an alternating current (AC) power source connector of the computing device, wherein a connection action comprises at least one of: a connection or a disconnection; and
      location history of the computing device;
   generating, based on the usage data, a prediction of a future connection action, based on a location of the computing device and the location history of the computing device, wherein the future connection action comprises at least one of a disconnection between the battery connector and a battery or a connection between the AC power source connector and an AC power source; and
   selecting a first portion of the battery to provide more power to the computing device than a second portion of the battery, the selecting being based on the prediction of the future connection action and ages of the first portion of the battery and the second portion of the battery.

15. A method according to claim 14, wherein the selecting is further based on dynamic system criteria of the computing device, the dynamic system criteria changing during operation of the computing device.

16. A method according to claim 14, wherein the selecting is further based on a first amount of charge in the first portion of the battery and a second amount of charge in the second portion of the battery.

17. One or more computer-readable storage media storing computer-executable instructions, which, when executed by a computing device, cause the computing device to:
   obtain, from the one or more memory storage devices, usage data comprising
      at least one of: a first prior connection action directed to a battery connector or a second prior connection action directed to an alternating current (AC) power source connector, wherein a connection action comprises at least one of: a connection or a disconnection; and
      location history of the computing device;
   generate, based on the usage data, a prediction of a future connection action based on a location of the computing device and the location history of the computing device, wherein the future connection action comprises at least one of a disconnection between the battery connector and a battery or a connection between the AC power source connector and an AC power source; and select a first portion of the battery to provide more power to the computing device than a second portion of the battery, the selecting being based on the prediction of the future connection action and ages of the first portion of the battery and the second portion of the battery.

18. One or more computer-readable storage media according to claim 17, wherein the selecting is further based on temperatures within one or more thermal zones of the computing device.

* * * * *